Figure 1:
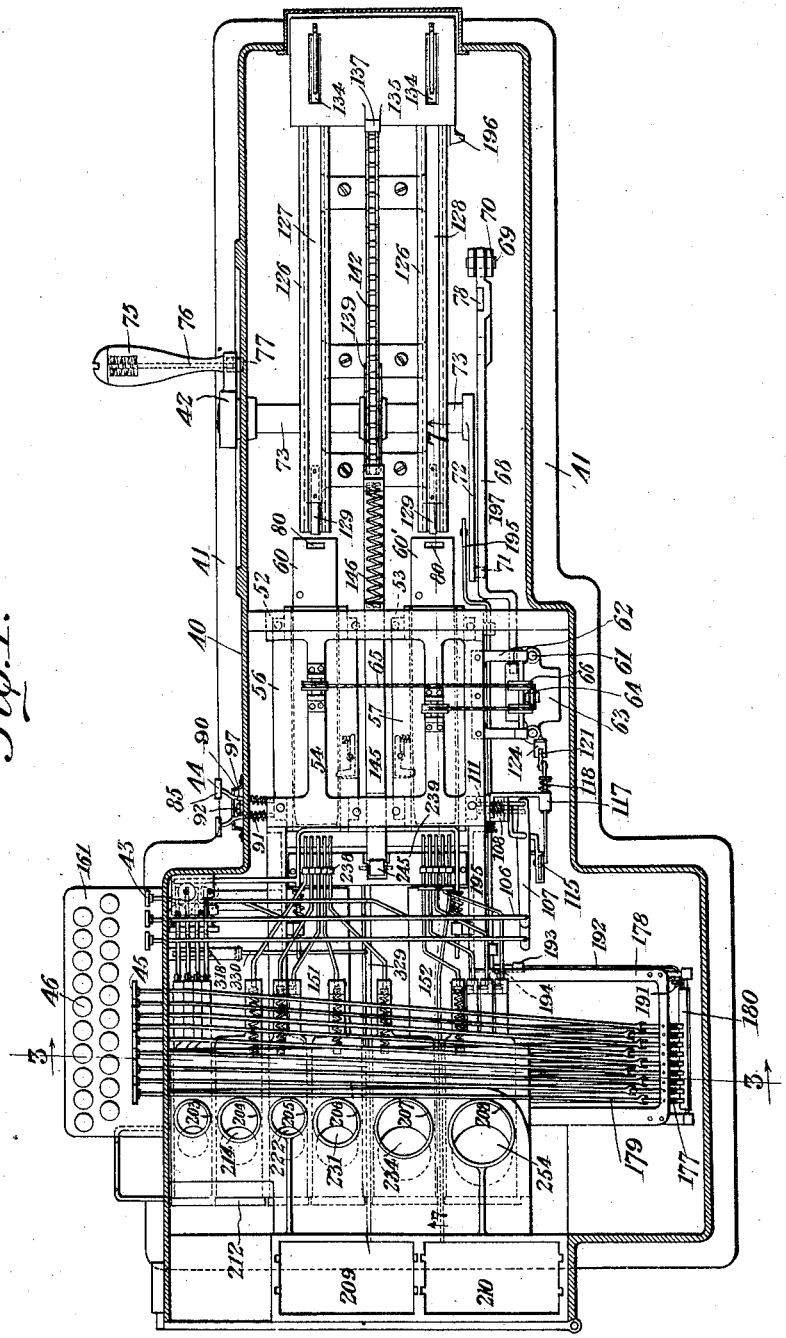

No. 851,146. PATENTED APR. 23, 1907.
C. ULMER.
CHANGE MAKING MACHINE.
APPLICATION FILED NOV. 4, 1905.

13 SHEETS—SHEET 1.

Witnesses

Charles Ulmer Inventor by

Attorneys

No. 851,146. PATENTED APR. 23, 1907.
C. ULMER.
CHANGE MAKING MACHINE.
APPLICATION FILED NOV. 4, 1905.

13 SHEETS—SHEET 4.

Witnesses

Charles Ulmer Inventor
by
Attorneys

No. 851,146. PATENTED APR. 23, 1907.
C. ULMER.
CHANGE MAKING MACHINE.
APPLICATION FILED NOV. 4, 1905.
13 SHEETS—SHEET 5.
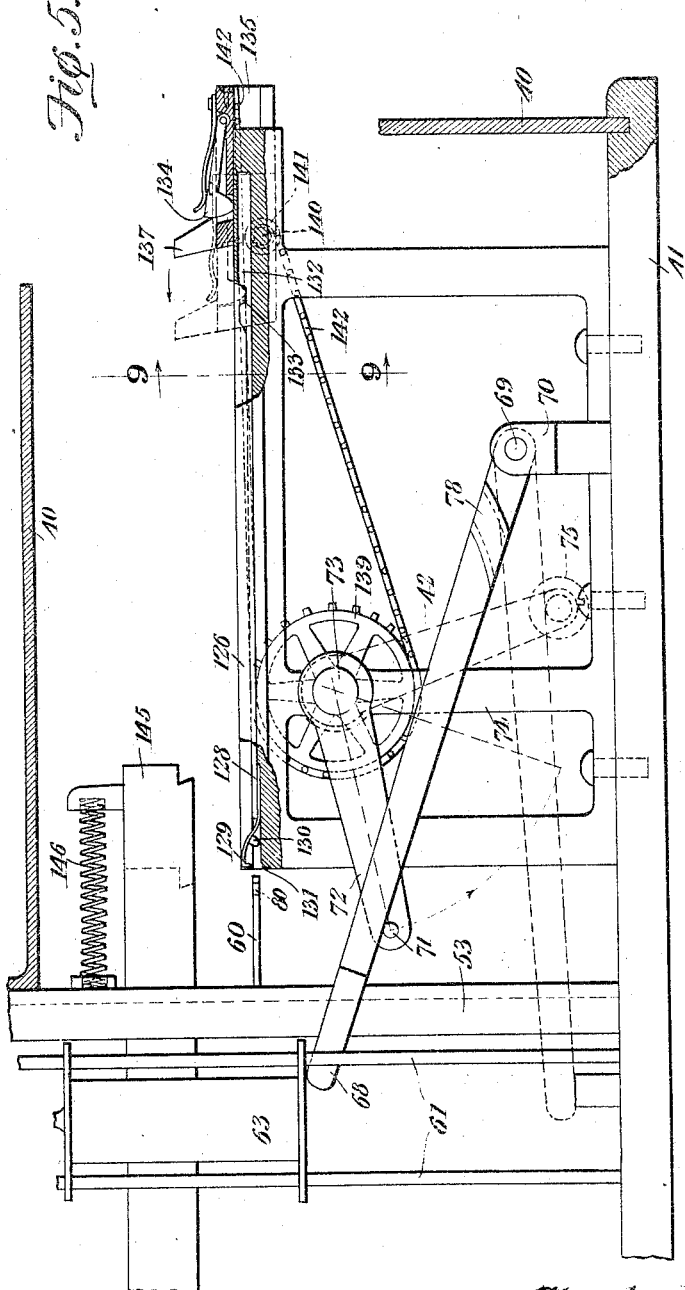
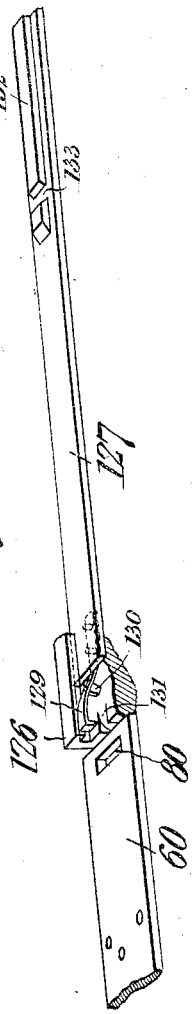
Witnesses
Charles Ulmer Inventor
by
Attorneys No. 851,146. PATENTED APR. 23, 1907.
C. ULMER.
CHANGE MAKING MACHINE.
APPLICATION FILED NOV. 4, 1905.
13 SHEETS—SHEET 6.
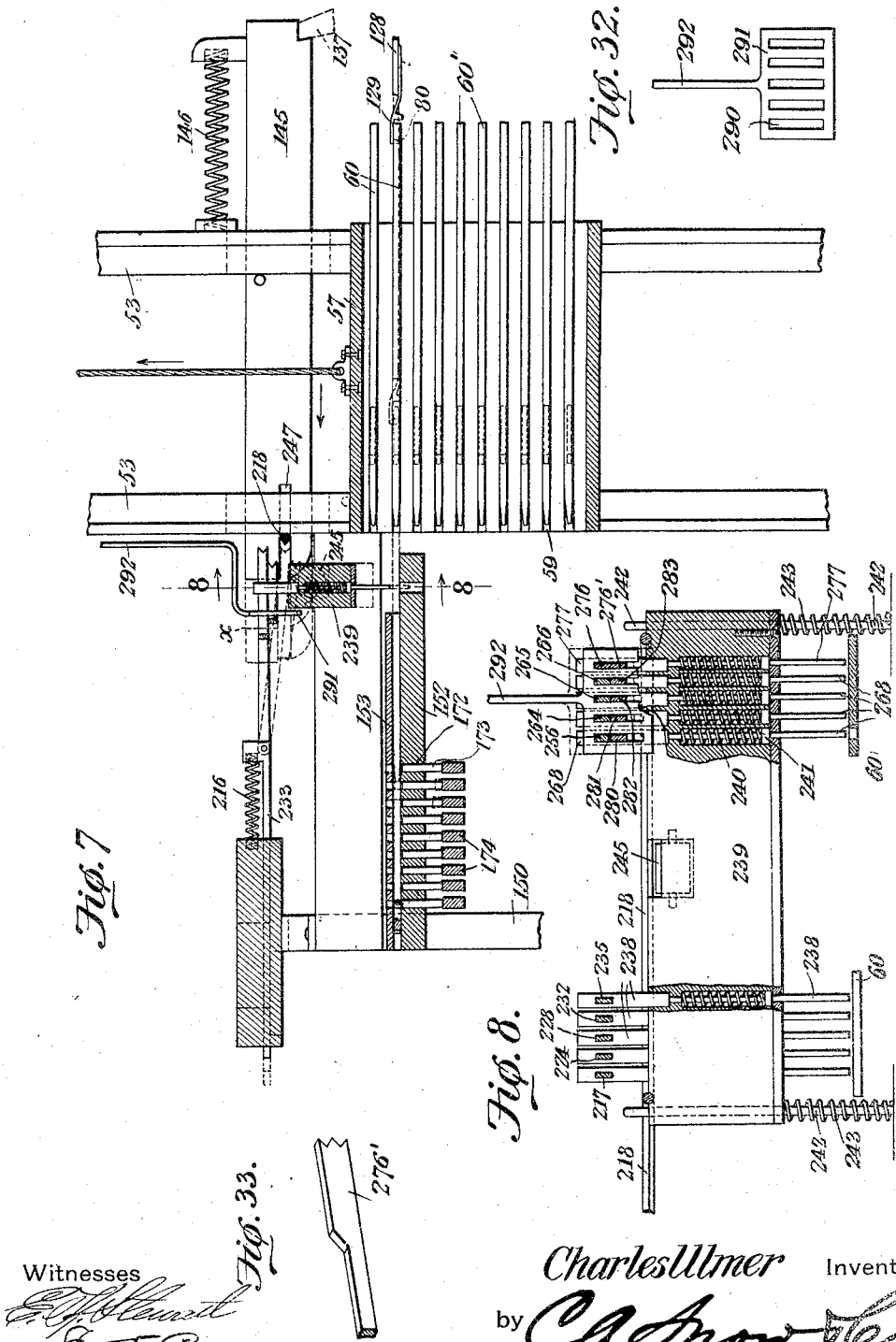
Witnesses
Charles Ulmer Inventor
by
Attorneys

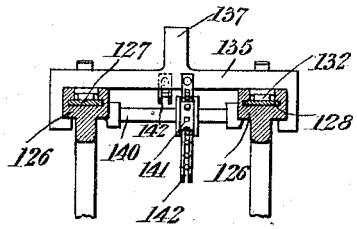
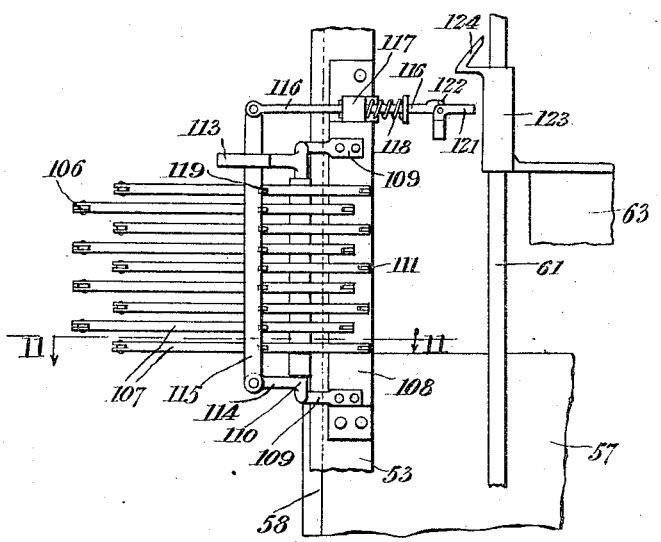
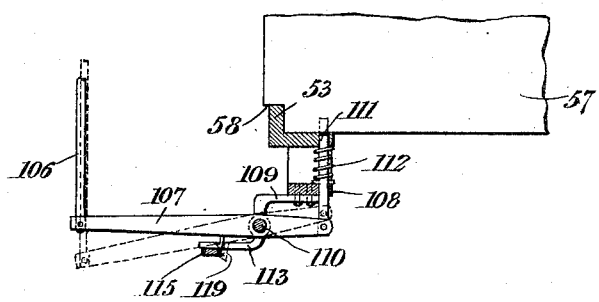

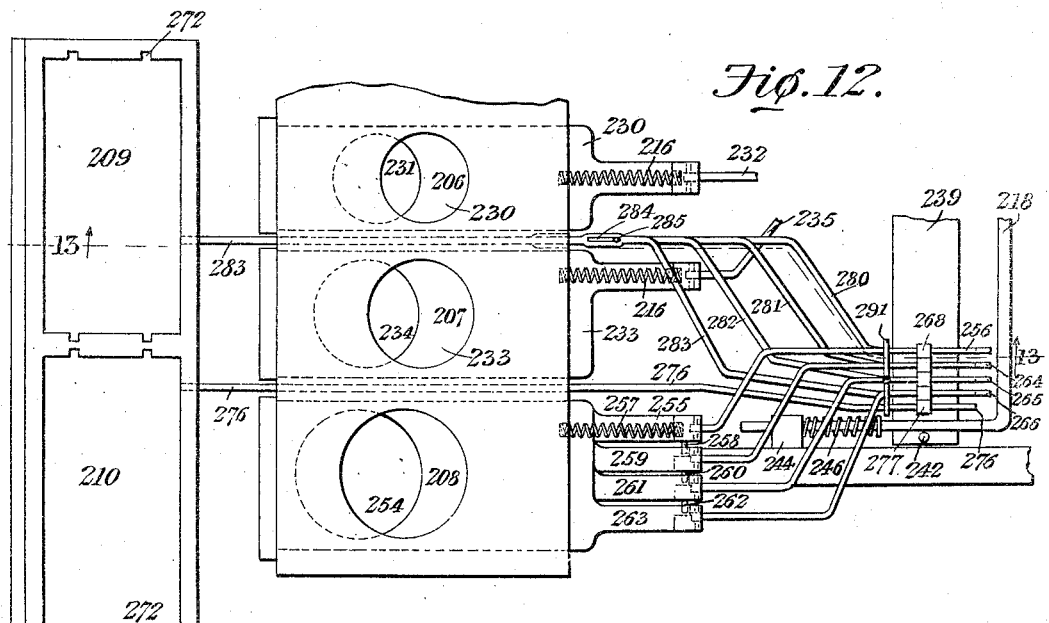
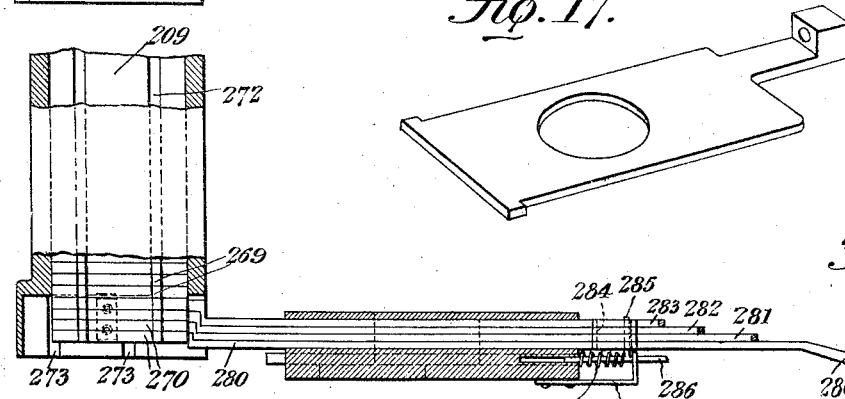
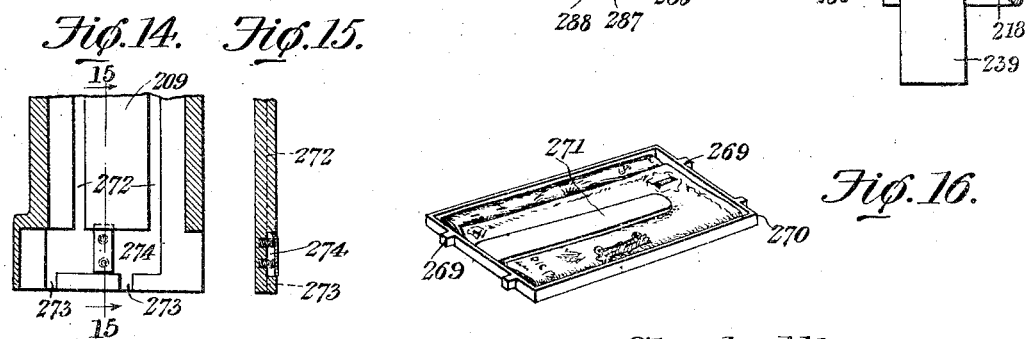

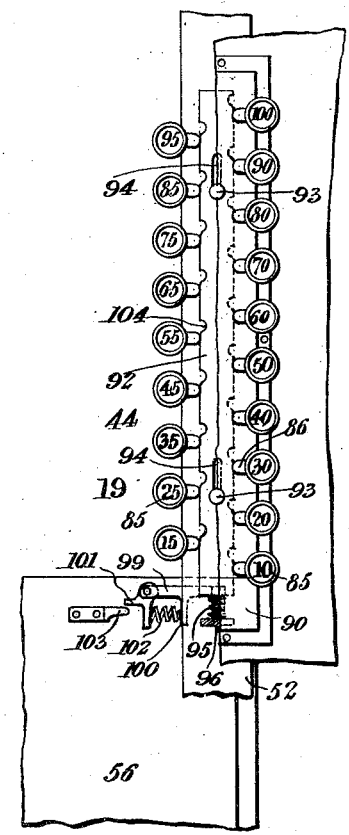

No. 851,146.
PATENTED APR. 23, 1907.

C. ULMER.
CHANGE MAKING MACHINE.
APPLICATION FILED NOV. 4, 1905.

13 SHEETS—SHEET 13.

Witnesses
E. J. Stewart
Jno. E. Parker

Charles Ulmer Inventor
by C. A. Snow & Co
Attorneys

No. 851,146. PATENTED APR. 23, 1907.
C. ULMER.
CHANGE MAKING MACHINE.
APPLICATION FILED NOV. 4, 1905.

13 SHEETS—SHEET 11.

Witnesses

Charles Ulmer Inventor
by
Attorneys

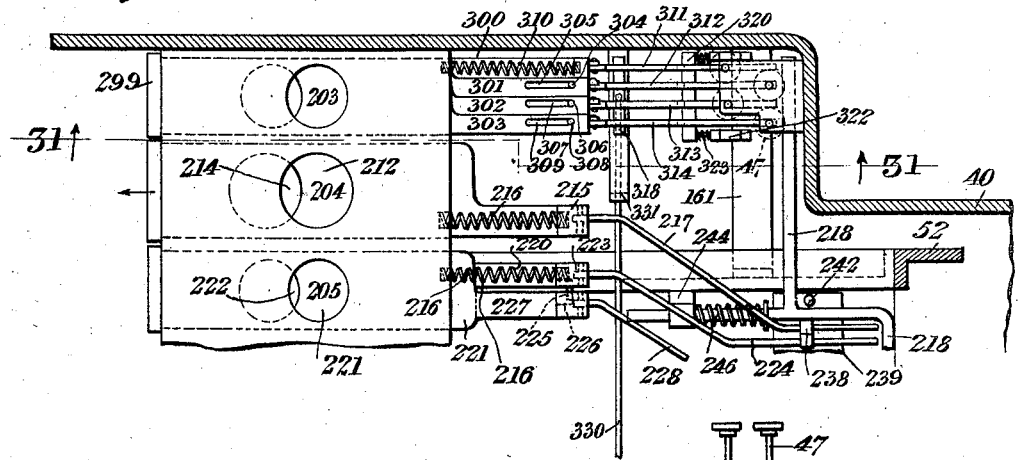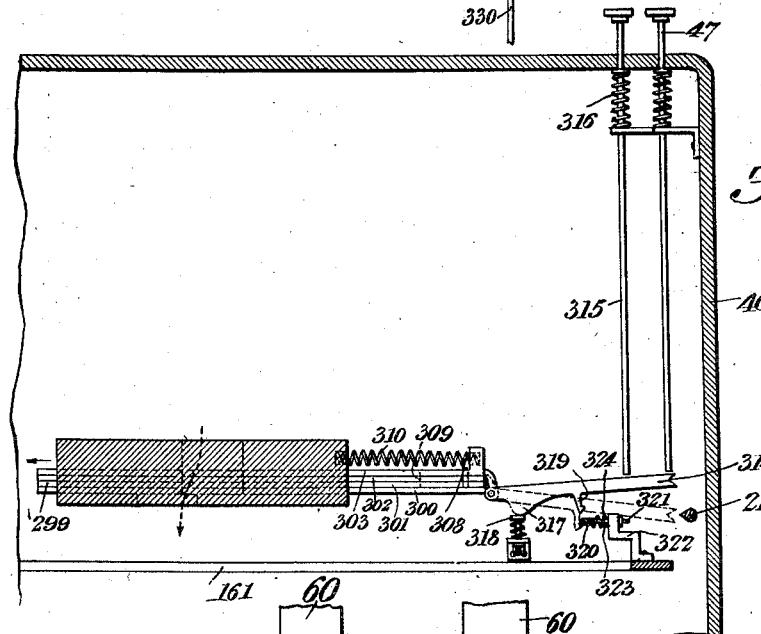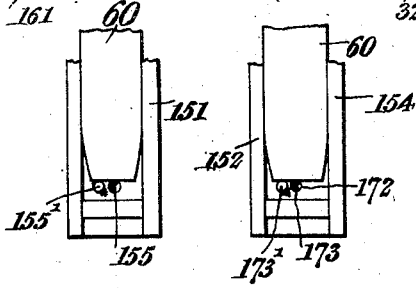

No. 851,146. PATENTED APR. 23, 1907.
C. ULMER.
CHANGE MAKING MACHINE.
APPLICATION FILED NOV. 4, 1905.
13 SHEETS—SHEET 13.
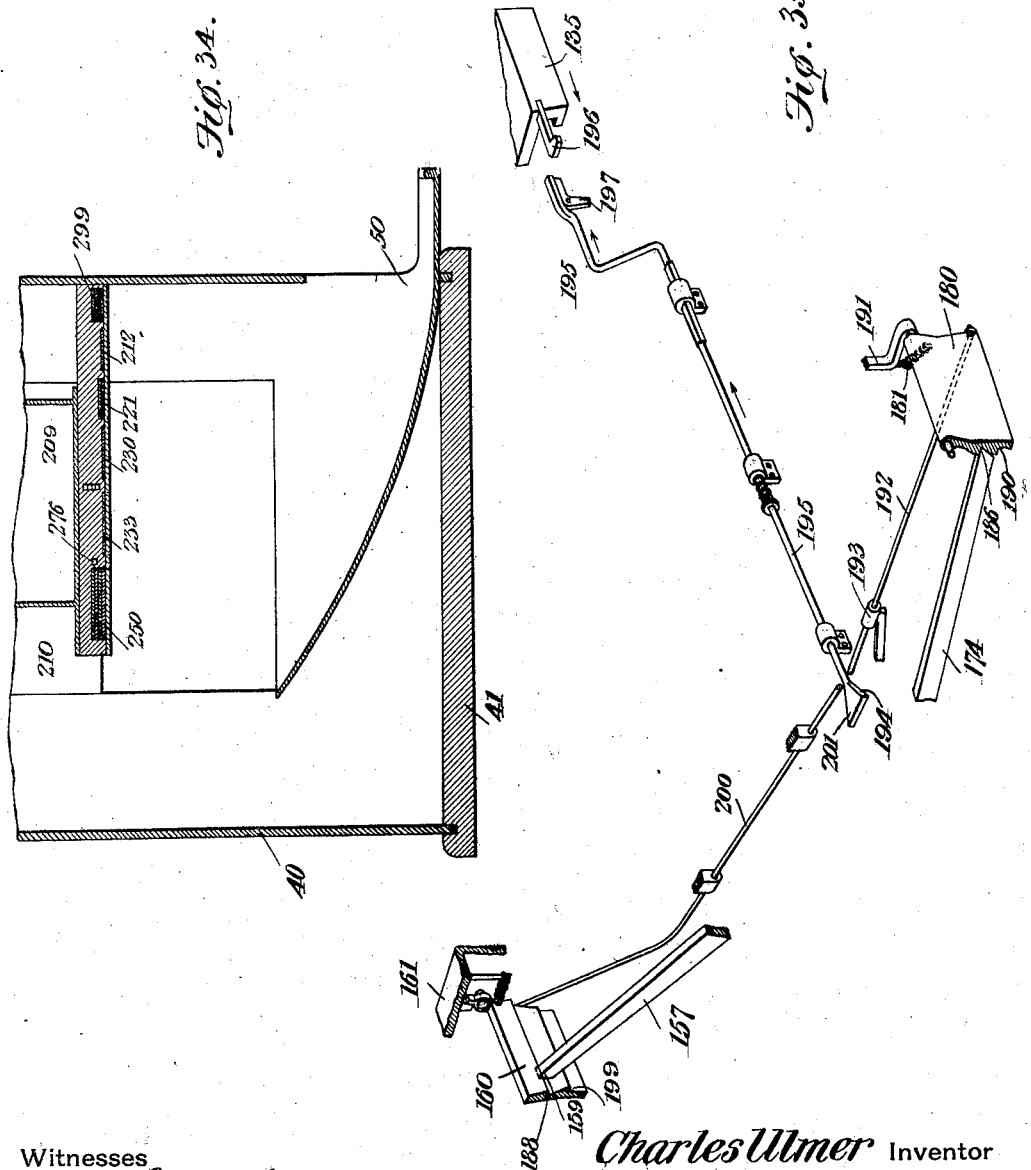
Witnesses
Charles Ulmer Inventor
by
Attorneys

UNITED STATES PATENT OFFICE.

CHARLES ULMER, OF LISBON, NORTH DAKOTA.

CHANGE-MAKING MACHINE.

No. 851,146.　　　　Specification of Letters Patent.　　　Patented April 23, 1907.

Application filed November 4, 1905. Serial No. 285,879.

*To all whom it may concern:*

Be it known that I, CHARLES ULMER, a citizen of the United States, residing at Lisbon, in the county of Ransom and State of North Dakota, have invented a new and useful Change-Making Machine, of which the following is a specification.

This invention relates to change making machines, and has for one of its objects to provide a machine in which change to any amount within a predetermined limit may be delivered with the utmost accuracy, provision being made for receiving or depositing money or checks of any value, whether the latter be in the form of even dollars, or representing fractional parts of dollars, and for deducting therefrom the amount of the purchase and delivering the exact change.

A further object of the invention is to provide a machine of this character in which the character of the change delivered is optional with the operator, that is to say, either bills or coin, or both may be delivered from the machine, as desired.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 2:
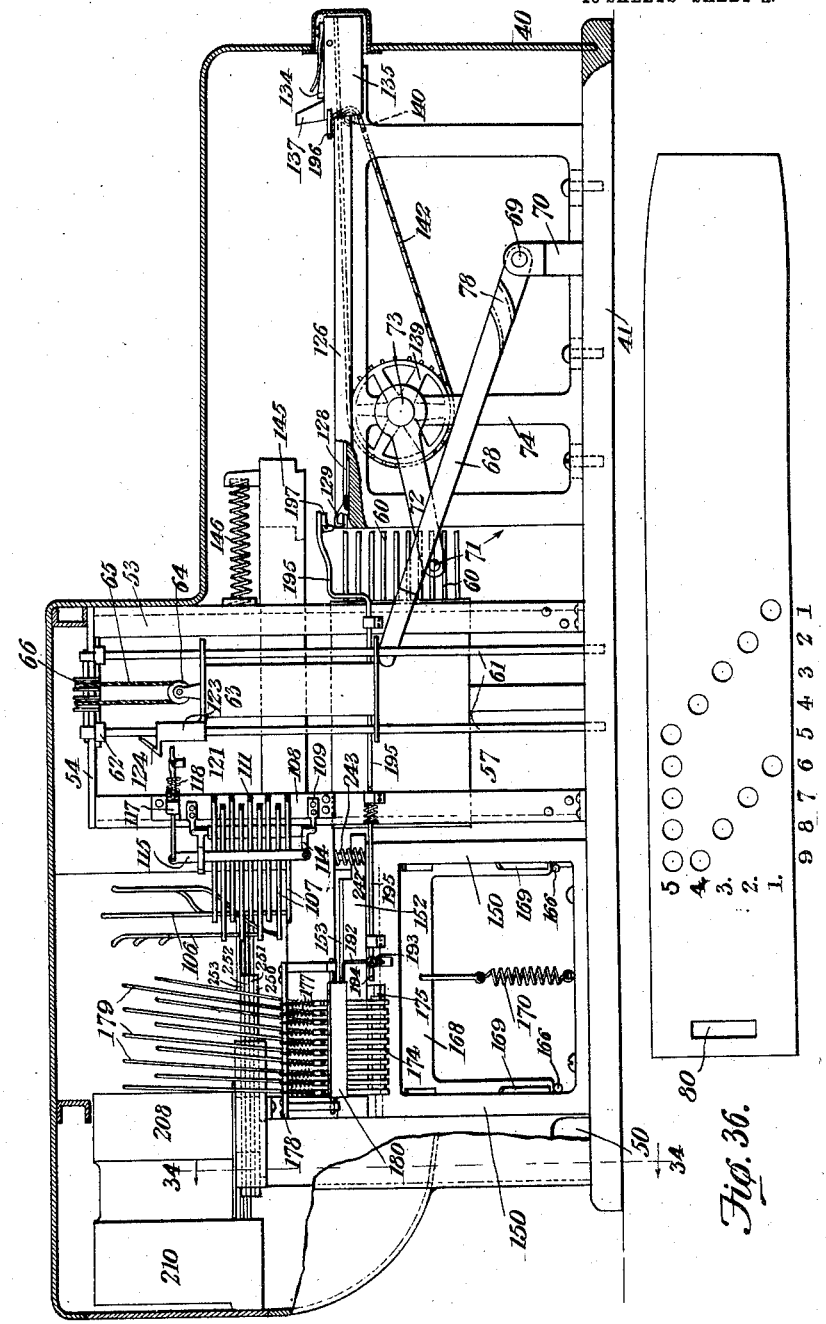
Figure 3:
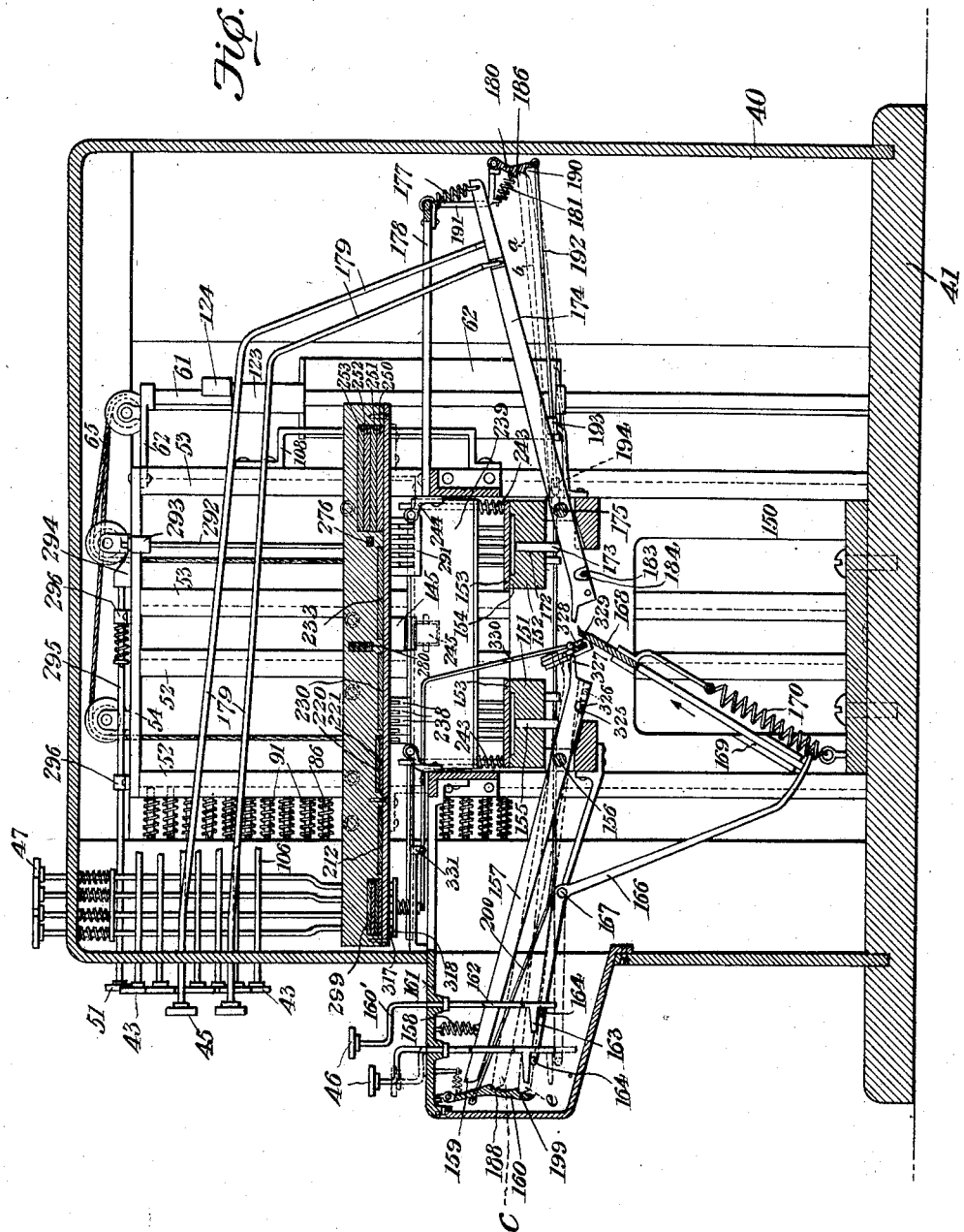
Figure 4:
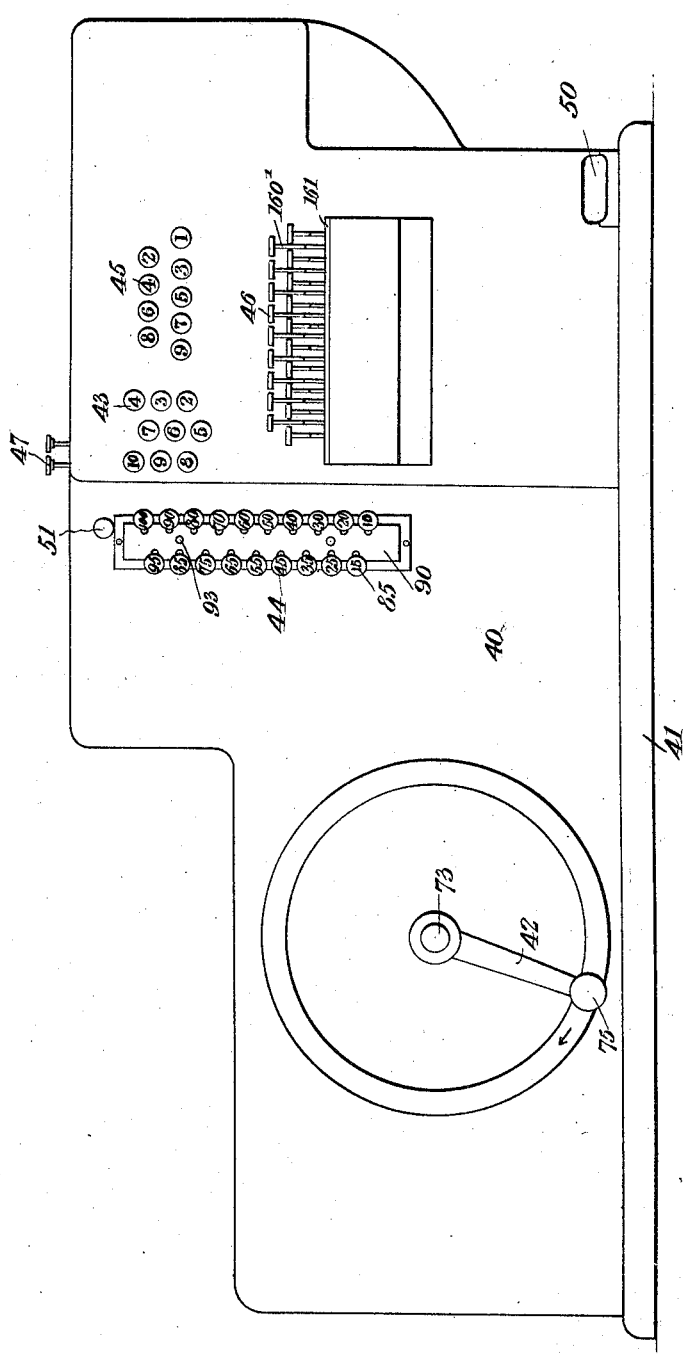

In the accompanying drawings:—Figure 1 is a plan view, partly in section, of a change making machine constructed in accordance with the invention. Fig. 2 is a side elevation of the same illustrating the casing and other portions of the machine in section. Fig. 3 is a transverse sectional elevation of the machine on the line 3—3 of Fig. 1, the view being on a slightly enlarged scale. Fig. 4 is a front elevation of the machine. Fig. 5 is a detail elevation, partly in section, of the mechanism shown to the right of Fig. 2, the view being on an enlarged scale and illustrating principally the mechanism for operating the selecting slides and the delivery devices. Fig. 6 is a detail perspective view of a portion of one of the selecting slides and its operating device. Fig. 7 is an elevation, partly in section, on the line 7—7 of Fig. 1, showing the selecting slides and other operating and carrying mechanisms. Fig. 8 is a transverse sectional elevation of the same on the line 8—8 of Fig. 7. Fig. 9 is a transverse sectional elevation of the main operating slide and its connections, on the line 9—9 of Fig. 5. Fig. 10 is a rear elevation of a portion of the machine illustrating the mechanism for controlling the extent of upward movement of the selecting slide carrier on the dollar side of the machine. Fig. 11 is a sectional plan view of the same on the line 11—11 of Fig. 10. Fig. 12 is a plan view, illustrating on an enlarged scale, the arrangement of the receptacles for containing quarters, half-dollars, silver dollars, and one dollar and five dollar bills, together with the delivery slides therefor. Fig. 13 is a sectional elevation of the same on the line 13—13 of Fig. 12, illustrating particularly the means for delivering dollar bills. Fig. 14 is a detail sectional view of one of the bill reservoirs, showing the means for guiding the bill holders. Fig. 15 is a vertical section of the same on the line 15—15 of Fig. 14. Fig. 16 is a detail perspective view of one of the bill holders. Fig. 17 is a similar view of the half-dollar delivery slide, detached. Fig. 18 is a front elevation of the bank of deposit keys. Fig. 19 is a sectional plan view of the same on the line 19—19 of Fig. 18. Fig. 20 is a detail perspective view, showing three of the levers at the dollar side of the machine, and the means carried thereby for determining the extent of movement of the selecting slides in accordance with the amount to be delivered. Fig. 21 shows the same members in a different position where the parts have been adjusted to stop the advance of the selecting slide in cases where change is to be delivered in any amount, say, even dollars, from one dollar upward. Fig. 22 is a detail sectional view illustrating this mechanism and the manner in which the movement of the preceding slide stop was accomplished. Figs. 23 to 28 inclusive are plan views of different selecting slides on the cents side of the machine and representing, respectively, slides arranged for the delivery of sums of five cents and multiplies thereof, the slide shown in Fig. 23 being arranged to deliver five cents, the slide in Fig. 24 to deliver five cents or ten cents, the slide in Fig. 25 to deliver five, or ten or fifteen cents, and the slide shown in Figs. 26, 27 and 28 having highest values of eighty-five, ninety, and ninety-five cents, respectively, and being capable of delivering any amount in multiples of five from five cents up to their highest values. Fig. 29 is a view in the nature of a diagram illustrating the key board mechanism and the selecting mechanism of the cents side of the machine. Fig. 30 is a plan view of a portion of the mechanism shown in Fig. 1, illustrating particularly the mechanism for delivering fractional currency, such as cents, nickels, and dimes. Fig. 31 is a sectional elevation of the same on the line 31—31 of Fig. 30. Fig. 32 is a detail view of the slide for determining the extent of vertical movement of the bars of the change delivering slides. Fig. 33 is a detail perspective view of the inner end of the bar which controls the discharge of five dollar notes. Fig. 34 is a transverse section of a portion of the machine on the line 34—34 of Fig. 2. Fig. 35 is a detail perspective view of the mechanism for releasing the key actuated levers after the delivery of the change. Fig. 36 is a plan view of one of the dollar slides, in this case the nine dollar slide, illustrating the arrangement of the openings for delivering even dollars from one to nine, inclusive. Fig. 37 is a partial plan view of the free end of one of the fractional currency slides showing its slotted guiding bar and one of the stop pins for limiting its movement. Fig. 38 is a similar view of similar portions of the dollar slide and its mechanism.

Similar numerals of reference are employed to indicate corresponding parts throughout the several figures of the drawings.

The machine forming the subject of the present invention is designed for the delivery of change in amounts of less than ten dollars, but the capacity of the machine may be altered to accommodate any amounts, and while in the present instance certain of the parts are referred to as dollar slides or dollar mechanism, and other parts as fractional currency or cents slides or delivery mechanism, it is to be understood that these may represent the monetary system of any country.

The working parts of the machine are arranged within a suitable casing 40 and are supported by a frame which includes a base 41 to which the lower edge of the casing is secured.

The machine generally is divided into two sets of mechanisms, one for the selection and discharge of even dollars, and the other for the selection and discharge of fractional parts of dollars, that is to say, the mechanism at the lower part of Fig. 1 and the right of Fig. 2 controls the selection and discharge of dollars, or multiples thereof, from the machine, while that portion of the mechanism at the upper part of Fig. 1, and to the left of Fig. 3, controls the discharge of fractional currency.

All of the parts are operated from the front of the machine (Fig. 4), the selecting being accomplished by banks of keys toward the right, and the actual operation of delivering the change being effected by a handled crank 42 which receives first a practically complete rotation clockwise, and then a practically complete rotation in the reverse direction.

The keys, for convenience, are separated into groups, the groups 43 and 44 being operated to correspond to the amount of deposit or amount received, the keys 43 representing dollars from two to ten, inclusive, and the keys 44 representing amounts from ten cents to one dollar in multiples of five. The groups of keys 45 and 46 are operated in accordance with the amount of purchase, the group 45 representing dollars from one to nine inclusive, and the keys 46 fractional currency from five cents to ninety-five cents in multiples of five.

As the United States monetary system does not now include any coin between a cent and a nickel, it is unnecessary to make any provision for the deposit or receipt of a nickel or less. As the purchase amount may be less than a nickel, another bank of keys 47 is arranged at the top of the machine, these keys being four in number and representing purchase values of one, two, three and four cents, respectively.

In using the machine, the deposit keys 43 and 44 are operated in accordance with the amount deposited, for instance, four dollars and fifty cents, which would require the depression of the key 4 of the bank 43, and the key 50 of the bank 44. The purchase keys are then operated, and if the purchase be four dollars and forty-six cents, the key 4 of the bank 45, the key 45 of the bank 46, and the key 1 of the bank 47 will be depressed. The crank 42 would then be turned clockwise to an extent of about three hundred and fifty degrees, and thence back again to its original position, this operation causing the delivery of the change, four cents, at the opening 50.

The only additional mechanism to be operated from the outside of the machine is a key 51, immediately above the bank 44, this key being depressed when it is desired to deliver paper money instead of coin. When this key is out, silver dollars to the number of four may be delivered, in change less than five dollars, or a five dollar note, or a gold piece and four silver dollars, but if the key is depressed, the machine will deliver dollar notes in place of silver dollars.

Within the casing is arranged a frame including two sets of vertically disposed angle bars 52 and 53, each set including four bars. The lower ends of these bars are secured to the base of the machine, and the upper ends are united by a frame 54.

Each set of bars 52 and 53 constitutes a guide for a slide carrying box, there being two of such boxes, 56 and 57, the former for the reception of selecting slides which control the discharge of fractional currency, and the latter being arranged for the reception of selecting slides which control the discharge of dollars or multiples thereof. These boxes are of the same construction, being provided with corner recesses 58 which fit against the vertical guide bars, and the boxes as a whole being of generally rectangular contour, and their inner vertical faces being provided with a plurality of horizontally disposed parallel grooves 59, said grooves being arranged in pairs and adapted for the reception of the selecting slides 60. In the box 56 are arranged nineteen pairs of grooves for the reception of nineteen slides 60 that control the discharge of amounts from five cents to ninety-five cents, in multiples of five, while in the box 57 are nine pairs of grooves for the reception of selecting slides controlling the delivery of even dollars from one to nine inclusive, and an additional set of grooves for the reception of a blank slide which prevents the delivery of any dollars where a dollar or less is tendered for purchase. (Fig. 7). The particular construction and arrangement of these slides will be hereinafter described.

At one side of the frame members is a pair of vertically disposed guide bars 61, the lower ends of which are secured to the base 41, (Fig. 5) while the upper ends are rigidly secured to the bracket 62, projecting from the upper frame member 54. These bars serve as guides for a vertically movable weight 63, to the top of which is secured a sheave 64, and over the sheave passes a flexible cable or chain 65 that is guided over suitable sheaves 66, supported by the frame, and has its opposite ends secured, respectively, to the boxes 56 and 57, and the weight is greater than the weight of the two boxes and the slides carried thereby, so that if left free, the weight will descend and the boxes will move to the top of the frame. In the normal position of the parts, however, the weight 63 is held at the highest point, as shown in Fig. 2, by means of an arm 68, one end of which engages under the weight, while the opposite end is pivoted to a pin 69 carried by a bracket 70 rising from the base plate. The lower face of this arm is engaged by a pin or antifriction roller 71 carried by a rocker arm 72 that is secured to the main operating shaft 73 of the machine, said shaft being journaled in suitable bearings that are carried by a frame 74, (Figs. 2 and 5) and being provided at its outer end with the operating crank 42. The handle 75 of this crank carries a spring pressed bolt 76 that is normally forced into a suitable recess 77 in the front of the casing, the connection between the two being sufficient to hold the crank and rocker arm 72 in proper position and to maintain the arm 68 and the weight 63 in the elevated position.

As before described, the crank arm 42 receives a clockwise movement at first, being the movement indicated by the arrow in Fig. 2, and this permits gradual lowering of the arm 68 and allows the weight to descend, this constituting the first portion of the selecting operation. After further movement, the pin or anti-friction roller 72 is allowed to pass through a suitable groove 78, formed near the pivoted end of the lever 68.

Figure 23:
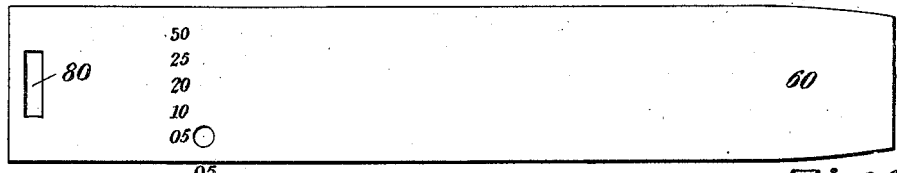
Figure 24:
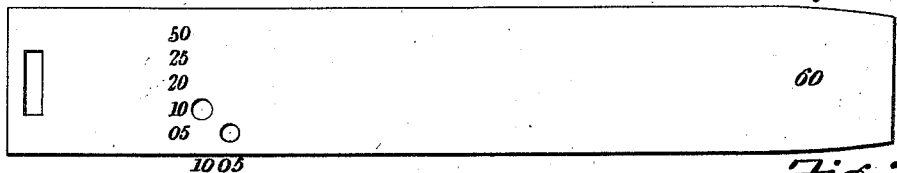
Figure 25:
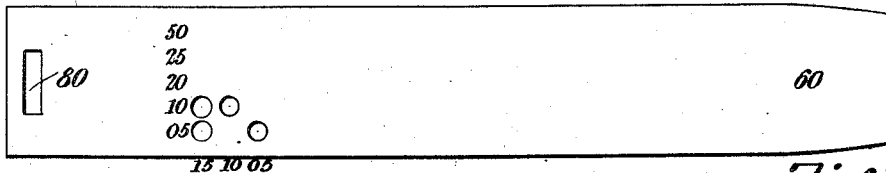

Referring now to Figs. 23 to 28, inclusive, 60 indicates the fractional currency selecting slides, there being nineteen of such slides in the box 56, and said slides are provided with openings the arrangement and number of which is governed by the amount of change under the control of the slide. Fig. 23 represents the five cent slide, this having a single opening to permit the delivery of five cents only, and this slide is arranged in next to the uppermost groove 59 of the box. The second slide, shown in Fig. 24, controls the delivery of both five cents and ten cents, and is arranged immediately below the five cent slide. The third slide, shown in Fig. 25, controls the delivery of five cents, ten cents and fifteen cents.

Figure 26:
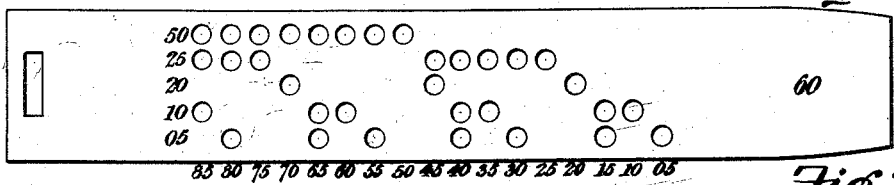
Figure 27:
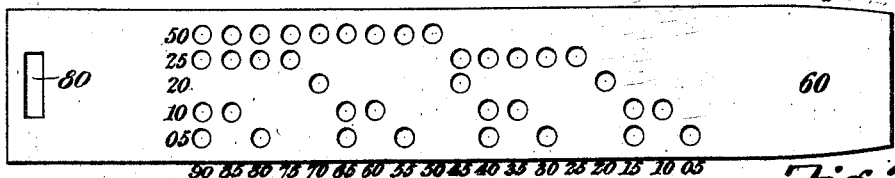
Figure 28:
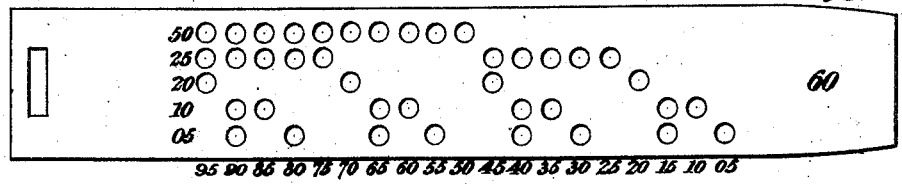
Figure 29:
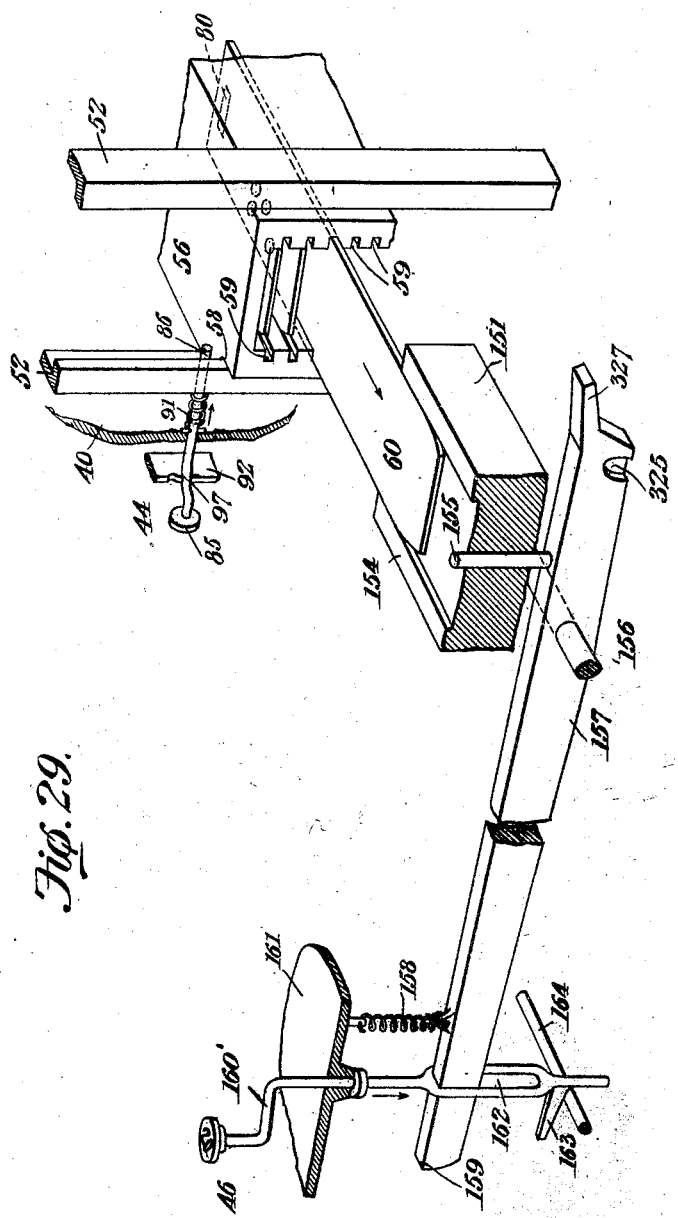

Fig. 28 represents the lowermost slide in the box, and this slide has under its control the delivery of amounts from five cents to ninety-five cents in multiples of five, the slide immediately above it, represented in Fig. 27, controls the delivery of amounts from five cents to ninety-cents in multiples of five, and the third slide from the bottom, being that shown in Fig. 26, controls the delivery of change from five cents to eighty-five cents in multiples of five, and so on throughout the entire series of slides.

The general arrangement or system of placing the openings in the slides will be evident on an inspection of these figures. The openings are divided into five rows, extending longitudinally of the slides, and parallel with each other, the row nearest one edge controlling the delivery of nickels, the next row the delivery of dimes; the next row the delivery of two dimes; the next row the delivery of quarter dollars, and the final row the delivery of half-dollars. The arrangement of the openings in these rows is governed by the position of members actuated by the deposit and purchase keys.

Each slide 60 is formed of a thin strip of metal, the front end of which may be slightly narrowed, while at the rear end is an opening 80 for the reception of a slide actuating means, hereinafter described.

The arrangement of the dollar slide 60' (Fig. 36) is exactly the same, except that there are nine selecting slides only in the box 57. This box also carries an additional blank slide which acts to prevent the delivery of dollars in cases where one dollar or less is tendered for purchase. The first and uppermost of the dollar slides has a single opening to permit the delivery of one dollar; the second has three openings to permit the delivery of one dollar, or of two dollars, and the third and fourth having openings to permit the delivery of three dollars and four dollars, respectively. The fifth slide has a single opening to permit the delivery of a five dollar bill, or five dollar gold piece and has, also, openings for the delivery of one or two, or three, or four dollars. The openings of the remaining slide are arranged on the same principle, so that the ninth slide, (Fig. 36) being the slide of highest value, will control the delivery of even dollars from one to nine inclusive.

When the slide carrying boxes are allowed to ascend by the lowering of the operating lever or arm 68, they move upward for a distance determined by the deposit keys, and the greater the amount deposited, the further the boxes travel.

In case a dollar or less is tendered for purchase and none of the keys of the bank 43 is depressed, the box will move upward the full distance or until the lowermost blank slide is in position to be moved forward, and this blank slide will operate to prevent the delivery of any money from the dollar or five dollar magazines.

Each of the keys in the bank 44 includes a finger piece 85, on which is marked the value of the key, that is 5, 10, 15, etc., and a shank 86, the latter being guided in three alining openings, (Figs. 18 and 19) one of which, 87, is formed in the outer casing, a second, 88, in one of the guides 52, and a third opening, 89, is formed in an outer guard plate or auxiliary casing 90, that is carried by the main casing, and normally these keys are held outward to the position shown in full lines in Fig. 19 by means of helical compression springs 91. When depressed they are moved to the dotted line position and are projected beyond the inner face of the guide strip 52 to form a stop for limiting the extent of upward movement of the box 56, as will be clearly seen on reference to Fig. 29.

Arranged within the auxiliary casing 90 is a locking strip 92, that is guided by headed pins 93 carried by the strip and projecting through vertically disposed slots 94 formed in the casing. This strip is normally held in elevated position by a compression spring 95 arranged between the lower end of the strip and a fixed bracket or lug 96 projecting from the casing. The opposite edges of the strip are inclined, and present or form stops with which may engage shoulders 97 formed on the inner sides of the shanks 86, so that when the keys are pushed inward, the shoulders will pass beyond the inner face of the strip and will be caught and held in the position to which they are adjusted. In this connection it is to be observed that as the shanks are arranged at other than a right angle to the outer face of the guide 52, the springs 91 will tend, to some extent, to throw the key shanks inward, that is, to move the shanks shown in Fig. 19 toward each other, in order to insure the locking of the shoulders 97 against the inner face of the strip, and when a key is once depressed, its shank will remain in position to stop the upward movement of the strip carrying box, until all of the parts have operated, and the change has been delivered.

Projecting from the lower end of the strip 92 is a bracket 99 having a pendant arm 100, and pivoted to the outer end of the bracket is a bell crank lever 101, the approximately vertical arm of which receives the thrust of a spring 102, placed between the arm and the pendant arm 100. The horizontal arm of the bell crank lever is disposed in the path of a lug 103, projecting from the side of the box 56, and as the box moves upward, the lug will engage the horizontal arm of the bell crank lever and will idly swing the same as it pushes past it without effecting any movement of the strip 92. On downward movement, however, the swinging of the bell crank lever is resisted by the spring 102, and said bell crank lever, together with the bracket 99 and the strip 92, will be carried down against the stress of the spring 95, until recesses 104 formed in the opposite edges of the strip arrive in alinement with the key shanks, whereupon the springs 91 of the keys force the latter out to initial position, and the parts are ready for another operation. After the strip has been moved down to its fullest extent, the spring 102 will yield and the pawl 103 will click past the bell crank lever until it is again below the same and in readiness for another operation.

The extent of movement of the box 57 which carries the dollar selecting strips is best shown in Figs. 10 and 11. In this case the bank of keys 43 are operated in order to project a pin or stop into the path of movement of the box 57, and each of the keys is provided with a shank member 106 that extends horizontally across the machine and is connected to the outer end of a lever 107, there being nine of such levers, as shown in Fig. 10.

Secured to one of the guide strips 53, and slightly spaced therefrom, is a strip 108 (Figs. 10 and 11) to which are secured a plurality of brackets 109, serving as supports for a vertically disposed pin 110, on which the levers 107 are independently pivoted. The inner end of each lever is connected to a pin 111 which extends through guiding openings in the angle bar 53 and the strip 108, and normally is held in the full line position shown in Fig. 11 by a helical compression spring 112. When a key is depressed, the parts move to the dotted line position shown in Fig. 11, and the inner end of the pin is projected beyond the inner face of the bar 53 into a position in the path of upward movement of the box 57, this forming the deposit key means for controlling the extent of upward movement of the dollar slide box.

Projecting from the upper bracket 109 is an arm 113, and from the lower bracket projects an arm 114. To this latter arm is pivoted the lower end of a bar 115 the upper end of which is guided by the arm 113, the extreme upper end of said bar being pivotally connected to a rod 116, passing through a suitable guiding lug 117 carried by the strip 108, and normally held in the position shown in Fig. 10 by means of a spring 118. One edge of the bar 115 is bevelled and is adapted to be engaged by catches 119, projecting from the levers 107, and when any lever is operated, that is, moved to the dotted line position of Fig. 11, this catch will ride on the inclined edge of the bar 115, and, passing over the outer face of the bar, will be locked in such dotted line position in order to hold the stop pin 111 in a position to limit the upward movement of the box 57. The outer end of the rod 116 carries a bell crank lever 121, the vertical arm of which is weighted to maintain the lever normally in the position shown in Fig. 10, and said arm is provided with a stop lug 122 to prevent movement of the bell crank lever in one direction, but leaving it free to swing in the opposite direction.

Secured to the weight 63 is a sleeve 123, that embraces one of the guide rods 61, and is provided with a cam 124, which, as the weight moves downward, during corresponding upward movement of the box 57, will strike the horizontal arm of the bell crank lever, and the latter will swing freely on its pivot, without affecting the position of the rod 116. When the weight ascends, at the completion of a change making operation, and while the box 57 is seeking the initial lowermost position, the cam 124 will engage against the horizontal arm of the bell crank lever and will move the latter inward, swinging movement being prevented by the lug 122, and, as a result, the rod 116 will be moved in the direction of its length, and the locking strip 115 will be forced outward in order to free any one of the catches 119 which may have engaged with the locking strip. The pins 111 control the exent of upward movement of the box 57 which carries the dollar selecting slides and determines the slide to be subsequently moved in selecting the amount or money to be delivered from the machine.

In the event of a dollar or less being tendered for purchase, none of the bank of keys 43 will be depressed, and the box 57 will thereupon move to the highest position presenting the lowermost or blank slide in position for further movement, this blank slide serving to prevent the delivery of any money from the dollar or five dollar magazines.

The frame 74, hereinbefore referred to, is provided with a pair of spaced parallel and horizontally disposed bars 126, (Figs. 2, 6 and 9) each of which is grooved for its entire length, and the walls of the grooves are under cut for the reception of two slides 127 and 128 that are adapted, respectively, to engage and operate the fractional currency and dollar selecting slides. At the outer end of each slide bar is secured a spring-catch 129, that normally is held in elevated position by a lug 130, secured to the bottom of the spring and bearing on the lower wall of the groove, but at the extreme end of the groove is arranged a notch 131, (Fig. 6) into which the lug rides and permits downward movement of the catch, so that the latter may enter the opening 80 of any slide which at the time is in position to be engaged, it being observed that the rear ends of all of the slides are arranged in a vertical plane close to the inner ends of the bars 126, and immediately after the operating bars 127—128 start to move, their catches will enter the openings in the ends of the selecting slides, and the latter will be moved forward for a distance dependent on the adjustment of the purchase keys.

At the rear end of each operating slide is a rib 132, that is provided with a notch 133 adapted to receive a pivotally mounted spring pressed catch 134, (Fig. 5) there being an independent catch for each operating slide. These catches are pivoted to a slidable block 135 that is mounted on the guide bars 126, the opposite sides of the block having pendant flanges that are grooved for the reception of the side walls of said bars, and from the upper central portion of the block extends a projection 137 for a purpose hereinafter described.

The main shaft 73 is provided with a sprocket wheel 139, (Fig. 5) and the frame has bearings for a transverse shaft 140 carrying a sprocket or guide wheel 141. Around these two wheels passes a link belt 142, the opposite ends of which are secured to the block 135, and when the shaft 73 is turned in the proper direction, the block will be moved forward in the direction indicated by the arrow in Fig. 5. During the movement from the full line to the dotted line position shown in Fig. 5, the catches 134 will ride on top of the ribs 132, and no movement of the operating slides will occur, this idle movement being for the purpose of allowing the weight to descend, and as soon as the latter has been lowered, the further forward movement of the block will cause the catches 134 to enter the recesses 133 of ribs 132, and the slides will then be carried along with the block. During the first portion of the movement, the catches 129 will engage in the openings 80 of any selecting slides which have been adjusted to position by the operation of the deposit keys, and said slides will be carried forward to an extent determined by adjustment of the purchase keys. The extent of movement of the selecting slide is, of course, variable, and in order to permit this, while obtaining a full stroke of the block 135, the spring pressed catches 134 come into play. When the resistance to the forward movement of the slide is suddenly increased by stoppage of said slide, the spring catch rides out of the recess 133 and over the end of the rib 132, thence sliding over the face of the operating slide for any required distance, so that there is no danger of breakage, and perfect action under all possible selecting movements of the slides is provided for.

Near the completion of the forward movement of the block 135, the lug 137 will engage against the end of a horizontally slidable bar 145, (Figs. 2 and 5) and will move the latter against the stress of a spring 146 from the position shown in full lines to the position shown in dotted lines, Fig. 5, this bar serving to transmit movement to the mechanism by which the money is delivered from the containing receptacles, as will be hereinafter described.

On the return movement of the main operating crank and shaft 73, the first effect of the movement will be to allow spring 146 to move the bar 145 from the dotted line to the full line position; the operating slides 127—128 will withdraw the selecting slides 60—60' until the lugs 130, riding against the inclined walls of recesses 131, will disengage catches 129 from the openings 80, and on further movement the catches 134 will ride out of the recesses or notches 133 of ribs 132, and the box operating weight 63 will be elevated as previously described.

Near the delivery end of the machine is a frame 150 (Figs. 2 and 3) that forms a support for two parallel horizontally disposed bars 151 and 152, the upper faces of which are provided with grooves for the reception of the selecting slides, the latter being moved through said grooves in the direction of the length of the bars by the mechanism previously described, and the slides are held from upward movement by cover plates or strips 153, secured to the edge flanges 154 of said bars.

The bar 151 is provided with a centrally disposed row of alining openings for the reception of stop pins 155 of a number equal to the number of keys of the bank 46, there being nineteen of such keys in the present instance, and each having an independent connection with one of the pins. When a key is depressed, the corresponding pin is moved upward across the guiding groove, and in the path of movement of the selecting slide, so that the slide is stopped at a point determined by the key depressed.

Arranged under the bar 151 is a pivot bar 156 on which are mounted a number of independent levers 157 each of which supports one of the pins 155, while the opposite ends of the levers, which extend under the bank of keys 46, are normally held elevated by tension springs 158, and at the extreme outer end of each lever is a shoulder 159 which engages with a locking strip 160, hereinafter described, the function of the strip being to lock any key in depressed position.

Each of the keys 46 has a shank member 160' (Figs. 3 and 29) that is guided in an opening formed in the horizontal portion 161 of the casing, and the lower portion of the shank is provided with an elongated eye 162 that embraces the lever 157, and below the eye is a finger 163 arranged to engage with a rod 164 extending across the full width of the keyboard. In practice two rods 164 are employed in order to accommodate the two rows of keys of the bank 46, and both rods are rigidly connected to the approximately horizontal arms of the bell crank levers 166 that are fulcrumed on pins 167 carried by the casing. The opposite arms of the bell crank lever engage with the opposite arms of an advance pin slide 168 (Figs. 2 and 3) adapted to suitable guides 169 in the frame 150, and normally held depressed by a spring 170. The function of this slide is to prevent the delivery of an excessive amount from the dollar reservoirs in cases where the change to be delivered is less than a dollar, or any amount involving fractions of a dollar, as hereinafter more fully described.

The bar 152 is provided with a centrally disposed row of openings 172 for the reception of vertically movable pins 173, of a number equal to the number of purchase keys in the bank 45, there being nine of such keys in the present instance. Each pin is supported by a lever 174 pivoted on a horizontally disposed shaft 175 that is supported by the frame. The outer or rear end of each lever is connected to a spring 177, hung from a bracket 178, and tending to maintain the lever in elevated position with the stop pin depressed. Each lever is connected by a rod 179 to one of the keys of the bank 45, and when any one of such keys is depressed, its corresponding pin 173 will be elevated into the path of the dollar selecting slide, the extent of movement of such slide being determined by the position of the pin, and when the lever is operated, its outer end will be caught and held by a locking strip 180, so that the pin will be maintained in elevated position after the removal of the finger from the key (Figs. 3 and 35.)

In the construction as thus far described, it will be seen that the operator may depress any of the purchase keys of the dollar bank to elevate any pin 173 into the path of movement of the dollar selecting slide, and in similar manner may depress any purchase key in the fractional currency bank 46, and elevate any one of the stops pin 155 to adjust or limit the extent of movement of the fractional currency selecting slide.

In many cases it is necessary to "split up" a dollar in order that proper change may be made, for instance, if five dollars is deposited and the amount of purchase be three dollars and fifty cents, the machine must deliver one dollar and fifty cents change. The operator depresses first the five dollar key of the deposit bank, and then the three dollar key and fifty cent key of the purchase bank. Ordinarily the operation of the three dollar key of the purchase bank would move one of the pins 173 to a position to stop the selecting slide in such manner that, owing in part to the previous selecting movement of the deposit key, the dollar side of the machine would deliver two dollars change, and on the fractional currency side the depression of the fifty cent purchase key, together with the depression of a key of the dollar bank on the deposit side would cause the delivery of fifty cents in fractional currency, so that the machine would then deliver two dollars and fifty cents, or one dollar in excess of the proper amount. To correct this it becomes necessary to provide for the stopping of the dollar selecting slide in advance of the position to which it would ordinarily move when the three dollar key of the purchase side is depressed and a fractional currency key of the purchase side is also depressed. To explain this more fully, if the amount of deposit be five dollars, and the purchase three dollars, it is not necessary to further control the movement of the dollar selecting slide, and the machine delivers two dollars change, but where the purchase is three dollars and a fraction of a dollar, the operation of the fractional currency keys of the purchase side must stop the advance movement of the dollar selecting slide before it reaches the position selected by the depression of the three dollar purchase key.

Referring now more particularly to Figs. 20, 21 and 22, it will be seen that each of the levers 174 is provided with a forwardly extending tongue 182, and that one side of each lever is provided with a laterally projecting pin 183, and the opposite side with a recess 184, the pin of one lever entering the recess of the next adjacent lever representing the next highest value, that is to say, the pin carried by the seven dollar lever will enter the recess of the eight dollar lever, and the pin of the eight dollar lever will enter the recess of the nine dollar lever. The arrangement of the recesses, however, with respect to the pins is such that on the depression of any key of the dollar bank, its corresponding lever will be freely moved to project the pin 173 the proper distance without causing the laterally projecting pin 183 to engage with the wall of the recess 184, and this first movement brings the rear end of the lever to the dotted line position a of Figs. 3 and 22, the end of the lever entering a recess 186, in the locking strip 180, while the tongue 182 is moved from a position to one side of the plane of movement of the advance pin slide 168, to a position in the path of movement of such slide, all of the remaining levers of the bank remaining in the full line position shown in Figs. 3 and 22, and the position of the parts is further illustrated in Fig. 20, wherein the first lever 174 is shown as projecting its pin 173 into the path of movement of the selecting slide, while the remaining levers are in normal position.

The key of the dollar bank, in the present instance the key three, for example, having been depressed, the fractional currency key fifty of the bank 46 is depressed, and in moving down, the tongue at the rear end of its corresponding lever 157 engages in a notch 188 in the locking strip 160, while the pin 155 of this lever is adjusted into the path of movement of the fractional currency selecting slide, as will be seen on reference to Fig. 29. This initial downward movement moves the lever to the dotted line position c of Fig. 3, and the tongue 163 of the key shank, engaging cross bar 164, depresses the same, and the movement is transmitted to the bell crank lever 166, and from thence to the advance pin slide 168, the latter being forced upward in the direction of the arrow, Figs. 3 and 22, and its beveled upper edge engaging the three dollar lever which has been moved to the dotted line position a and moving said lever further upward, or to the dotted line position b of Fig. 22. During the initial movement of the three dollar lever, its pin 183 is moved upward in the slot 184 of the four dollar lever, until it is nearly in contact with the wall of the slot. The further upward movement of said three dollar lever from the position a to the position b causes pin 183 of the three dollar lever to engage against the wall of the slot 184 of the four dollar lever and move said four dollar lever upward, carrying with it the pin 173 of the four dollar lever, so that the selecting slide is stopped, not by the pin of the three dollar lever, but by the pin of the four dollar lever, as will be evident on reference to Fig. 21, and this prevents the delivery of two dollar from the dollar magazine, only a single dollar being delivered therefrom, and in every case where a fractional currency key is depressed, the slide 168 will engage with and move the previously depressed dollar purchase key to cut off or split up the dollar.

When lever 174 is depressed to an extent sufficient to move up the next adjacent lever, the rear end of the operating lever will be moved to the dotted line position $b$ of Figs. 3 and 22 and will enter a notch 190 formed in the locking strip 180. This, however, is not in all cases essential, inasmuch as the lever receiving the secondary movement will have entered notch 186 of the strip.

The locking strip 180 is pivoted on an arm 191 extending from the bracket 178, and is held in lever engaging position by a spring 181, (Fig. 35) and the lower edge of the strip is connected at one end to a rod 192 one end of which passes through a suitable guide 193 carried by the frame and is disposed in the path of movement of a cam block 194 that is arranged at one end of a longitudinally movable bar 195, extending through suitable guide ways toward the rear of the machine, and in a position to be engaged by a lug 196 projecting from the slide block 135. On the rear end of the rod 195 is a bell crank lever 197, the horizontal arm of which lies against the lower face of the rod, while its vertical arm is disposed in the path of movement of the lug 196, so that on the forward movement of the block, the lug will ride past the bell crank lever without operating said rod, but on the reverse movement of the block, as the parts are being returned to initial position, the lug will positively engage with the bell crank lever and will pull the same to the rear, so that the cam 194 will be moved past the end of the rod 192 and this movement will be transmitted to the locking strip 180, the latter being forced outward and releasing all of the levers 174 which are then returned to initial position by their springs 177.

The locking strip 160 for the fractional currency key levers is provided with the notch 188 and with a second notch 199, the second notch being arranged to engage the levers when the latter are moved to the dotted line position $e$ of Fig. 3, as will be hereinafter described. The lower edge of the strip 160 is connected at one end to a rod 200 that extends across the machine and is disposed in the path of movement of a cam 201 carried by the rod 195, this cam serving to move the locking strip 160 outward from engagement with the fractional currency levers and allowing the same to return to the initial position.

At the delivery end of the machine are vertically disposed reservoirs or magazines for the reception of money to be delivered, and these in the present instance comprise a cents-reservoir 203, a nickel reservoir 204, a dime reservoir 205, a quarter of a dollar reservoir 206, a half a dollar reservoir 207, a silver dollar reservoir 208, a paper dollar reservoir 209, (Fig. 12) and a reservoir 210 for the reception of five dollar bills or five dollar gold pieces, the arrangement being carried still further, and reservoirs being provided for ten, twenty and fifty dollar notes, if desired. All of these reservoirs are preferably of the detachable type to permit their being removed and placed in a vault over night.

The mechanism for delivery of cents from the magazine 203 will be described later.

For the delivery of fractional currency other than cents, delivery slides are arranged under the respective magazines. Under the nickel magazine is a slide 212 having an opening that is normally directly under the magazine, and receives the lowermost coin therefrom, the thickness of the slide being approximately equal to the thickness of a nickel, and when said slide is moved in the direction of the arrow, Fig. 30, the opening will be moved into alinement with a delivery opening 214, and the nickel contained in the opening will be dropped through the delivery opening and will be guided by a suitable chute or other means to the point of delivery. The shank 215 of the slide is engaged by a compression spring 216 that tends normally to hold the slide in the position shown in Fig. 30, and projecting from the shank is a rod 217, the rear end of which is notched for the reception of a delivery bar 218, as shown in Fig. 7.

Arranged under the dime magazine are two slides 220 and 221, each being of a thickness approximately equal to the thickness of a dime, and each being provided with an opening of the diameter of a dime, so that normally the two lowermost dimes will rest within said openings, and if the lowermost slide alone is moved, the lowermost dime will be delivered through an opening 222, but if both slides are moved simultaneously, two dimes, or twenty cents, will be delivered through said opening. The shank 223 of the slide 220 is normally held in the position shown in Fig. 30 by one of the springs 216, and is engaged by a rod 224, the rear end of which is notched to receive the delivery bar 218, and from the shank 223 extends a pin or lug 225 that enters a recess 226 in the shank 227 of the uppermost slide 221. If a dime is to be delivered, the bar 224 alone receives movement, and the lowermost slide 220 is moved to effect the delivery of the dime, the pin 225 leaving the recess 226. If the sum of twenty cents is to be delivered, the bar 228, projecting from the shank 227 is operated, and the end wall of the recess 226 engages the pin 225, so that both slides are simultaneously moved forward, and two dimes are delivered from the reservoir.

Under the quarter dollar magazine is a slide 230 having an opening for the reception of a single quarter, and when the slide is operated, a quarter is delivered through an opening 231. The shank of this slide is held down by one of the springs 216, and to the shank is connected a rod 232, the rear end of which is notched for the reception of the said bar 218.

Beneath the half dollar magazine is a slide 233 having an opening for the reception of a single coin, and operable to deliver the coin through an opening 234 leading to the point of discharge. The shank of this slide is operated upon by one of the springs 216, and said shank carries a rod 235, also notched at its rear end for the reception of the delivery bar 218, and the connection between all of the rods and their shanks is pivotal, so that said rods may move from the normal position shown by full lines in Fig. 7, to the position shown in dotted lines in said figure.

The several rods 217, 224, 228, 232, and 235 extend through selector pins 238, each rod having an independent connection with a pin.

The pins 238 are guided in vertical openings formed in a vertically movable bar 239, and the openings are of sufficient diameter to receive small compression springs 240 that bear at one end against collars 241, rigidly secured to the pins, and at the opposite end against the end wall of the opening. The collars 241 by engagement with the bar 239 serve to limit downward movement of the pins with respect to the bar, and the heads of the said pins extend some distance above the bar and are provided with openings for the passage of the several rods leading from the delivery slides.

The bar 239 is guided by a pair of vertically disposed rods 242 carried by the frame, and is normally held in the highest position by helical compression springs 243 (Fig. 8). The central portion of the upper edge of the bar is recessed for the reception of a roller 245, mounted on a horizontal arbor carried by bearings on the bar, and this roller is disposed in the path of movement of the forward end of the bar 145 that is actuated by lug 137, Fig. 5. The lower edge of the forward end of the bar 145 is rounded (Fig. 7) and forms a cam which engages with the roller, so that during its movement from the full line position toward the dotted line position, Fig. 7, the bar 239 will be depressed, and in moving down will carry with it all of the pins 238.

The selecting movements controlled by the deposit and purchase keys have previously effected the movement and the stoppage of one of the slides 60, so that said slide rests directly under the row of pins 238, and the selecting movements have been such that the openings in the selecting slide that are in alinement with the pins correspond to the amount of fractional currency to be delivered. When the pins are carried down, such of the pins as are in alinement with the openings of the selecting slide will enter the openings, while the remaining pins will be pressed into contact with the blank surface of the slide and will not descend, to any material extent. If a nickel is to be delivered, an opening will be arranged under the pin and connected to rod 217, or if a quarter dollar is to be delivered, an opening will be arranged under the pin connected to rod 232, or any combination of openings may be formed, so that the amount delivered may range from five cents to ninety-five cents. Those pins which move down carry with them the slide operating rods to which they are connected, and the rear notched ends of said rods are brought down to the dotted line position shown in Fig. 7, and in the path of movement of the delivery bar 218.

The bar 218 is guided in lugs or brackets 244, and is normally held in the rear most position shown in Figs. 12 and 30 by means of springs 246, and the central portion of the bar is arranged within a slot 247 in the bar 145.

The preliminary movement of the bar 145 results in the depression of the cross bar 239, it being accomplished by the time bar 145 has arrived at the dotted line position x of Fig. 7, and by this time the end wall of the slot 247 will have engaged the delivery bar 218, so that on further movement of the bar 145 the delivery bar will be carried forward, and by engagement with the slide operating rods, will move all of the rods which have been depressed, and the movement will be transmitted to their respective delivery slides, resulting in the discharge of a coin or coins from the magazines.

The delivery bar 218, also, acts on the slides that control the delivery of silver dollars or paper money from the reservoirs, and the movement here is somewhat more complicated, owing to the necessity for placing the delivery of either paper or silver money under the control of the operator.

Arranged under the silver dollar magazine 208 are four slides 250, 251, 252, and 253, (Figs. 2, 3 and 5) each of which is provided with an opening of a diameter to permit the reception of a dollar, and each slide is approximately of the same thickness as that of a dollar. When in normal position, each opening contains one of the dollars of the magazine, and if all are simultaneously moved, four dollars will be discharged through the delivery opening 254, but if the lowermost only is moved, a single dollar will be discharged. The shank 255 of the lowermost slide is pivotally connected to a rod 256, and said shank is actuated upon by a spring 257 that tends to hold it in the normal position shown in Fig. 12. From this shank 255 projects a pin 258 arranged to enter a recess in the shank 259 of the slide 251, and from shank 259 projects a pin 260 arranged to enter a recess in the shank 261 of slide 252. From the shank 261 extends a pin 262 arranged to enter a recess in the shank 263 of the uppermost slide 253. The several shanks 259, 261, and 263 are connected to rods 264, 265 and 266, respectively, and all of said rods are provided with notched end portions to be engaged by the delivery bar 218. It will be seen from this construction that if the bar 256 is moved, a single coin will be delivered, while if rod 264 is moved, two coins will be delivered, and so on, the movement of the final rod 266, resulting in the delivery of four silver dollars. The several rods 256, 264, 265, and 266 pass through suitable openings in the heads of selecting pins 268 that are guided in the vertically movable bar 239, and are of the same construction as the pins 238, (Fig. 8.)

For the delivery of paper money from the machine, the reservirs 209 and 210 are employed, the reservoir or magazine 209 being arranged to contain one dollar notes, and the reservoir or magazine 210 to contain five dollar notes.

Each note is folded and place in a holding tray 270, (Fig. 16) preferably in the form of a rectangular metal box, open at the top and provided with a spring finger 271 which holds the note in place, and where these trays hold five dollar notes, recesses may be formed in the trays at points under the free ends of the springs, so that five dollar gold pieces may be substituted for the five dollar notes, if desired. From each end of each tray projects a pair of lugs 269, adapted to vertically disposed guiding slots 272 formed in the end walls of the magazine. Near the lower end of the magazine the slots 272 (Figs. 14 and 15) are off set, or are continued in the form of small delivery slots 273 that are not in vertical alinement with the slots 272, and between the lower ends of the slots 272 and the entrance ends of the slots 273 the walls of the magazine are cut away or recessed, as at 274 to permit lateral movement of the trays and lugs 269, so that a tray or trays entering the recessed portion of the magazine from slots 272 may be moved laterally until the lugs 269 are in alinement with the slots 273, whereupon the trays will fall from the machine and will be guided to the point of delivery.

For the five dollar magazine, where single trays only are delivered, the vertical height of the recess 274 may be equal only to the vertical height of one of the trays, but for the one dollar magazine, it is necessary to provide for the discharge of four trays, simultaneously, and for this purpose the vertical height of the recesses 274 is equal to the combined heights of four trays, as will be observed on reference to Fig. 14.

The five dollar notes are delivered by means of a rod 276, the rear end of which is notched and is adjustable is a position in alinement with the delivery bar 218. This rod passes through the head of a selecting pin 277, disposed in alinement with the pins 268, the five pins constituting a selecting series, which, under the control of the openings of the dollar selecting slides, will permit the discharge of any amount in even dollars from one dollar to nine dollars.

To effect the discharge of paper dollars from the magazine 209, four superposed bars or rods are required, these rods 280, 281, 282 and 283 being arranged, respectively, to deliver the first, second, third and fourth trays at the bottom of the magazine. All of these bars are provided with slots 284 for the reception of a pin 285 that projects from a bar 286 extending through an opening in a suitable guiding bracket 287, said bar being surrounded by a spring 288 that tends normally to hold all of the bars in the rearmost position, as shown in Fig. 13. The tray engaging ends of the several bars are stepped, so that while the lowermost bar 280 may move alone to discharge the lowermost tray, the similar movement of the second bar from the bottom will effect movement of the lowermost bar and two trays will be discharged. This construction is clearly shown in Fig. 13.

The several bars 280, 281, 282 and 283 are connected to the heads of the pins 268, and said bars are connected to the horizontal series below the bars 256, 264, 265 and 266, while the five dollar delivery bar or rod 276 is provided with a duplicate head 276', (Fig. 33) also, arranged in the lower row of bars. There are thus two rows of bars or rods, the uppermost controlling the delivery of four silver dollars and a five dollar note, and the lowermost controlling the delivery of four paper notes and the five dollar note, and either of these may be made operative at the option of the clerk.

Under ordinary circumstances the machine is arranged to deliver silver dollars, and the uppermost row of bars connected to the silver dollar slides and the five dollar reservoir will be depressed to a position to be engaged by the delivery bar. If the downward movement is limited, however, the lowermost set of bars connected to the bill or note delivery mechanism will be brought into play, and for this purpose the shank portions of both sets of bars extend through vertical slots 290 formed in a plate 291, arranged slightly in advance of the bar 239. This plate is connected to a vertical rod 292, (Fig. 3) the upper end of which passes through a guiding opening in a lug 293 carried by the frame member 54, and said rod is turned over to engage the upper face of a slidable cam 294 that is carried by a rod 295 passing through suitable guiding lugs 296 on top of said frame. This rod 295 extends out through an opening in the front of the casing and is connected to the paper key 51 shown in Fig. 4. If the paper key is depressed the cam 294 will raise the rod 292 and plate 291 until the lower ends of the slots 290 are elevated slightly, and this will limit the downward movement of all of the delivery rods or bars, so that only the lowermost set will be moved into alinement with the delivery bar 218, this lowermost set comprising the bars 280, 281, 282 and 283 that are connected to the paper dollar delivery mechanim and the five dollar delivery mechanism, and in this manner the delivery of either paper or silver money is placed under the control of the clerk.

Immediately after the delivery of the change by forward movement of the delivery bar 218, the bar 145 is drawn back; the delivery bar 218 is returned to its normal position by springs 246; the several delivery slides are restored to normal position by their springs, and the cam shaped end of bar 145 then leaves the bar 239 and allows the latter to ascend, until all of the pins are free from the openings of the selecting slides, after which the slides are withdrawn to proper position; their operating slides or bars are disconnected, and the slide carrying boxes again raised to operative position.

The mechanism thus far described will deliver fractional currency only, from five cents and upward in multiples of five, and to provide for the delivery of cents, some additional mechanism must be employed.

Under the cents reservoir 203 are arranged four slides 299, (Figs. 30 and 31) each having an opening for the reception of a single cent. To these slides, starting with the lowermost, are connected shanks 300, 301, 302, and 303, the shank 300 having a pin 304 entering a suitable slot 305 of the shank 301, while the shank 301 has a pin 306 entering a slot 307 in the shank 302. In similar manner the shank 302 has a pin 308 entering a slot 309 in the shank 303, and all of these shanks are held in normal position, shown in Fig. 30, by means of a spring 310.

The shanks 300, 301, 302, and 303 are connected, respectively, to pivot arms 311, 312, 313, and 314, the free ends of which are notched and are movable from a normal full line position shown in Fig. 31 to the dotted line position shown in the same figure, and in this latter position are disposed in the path of movement of the delivery bar 218. Arranged above the respective arms are the vertically disposed shanks 315 of the bank of keys 47, these keys being numbered 1, 2, 3 and 4, and being maintained in elevated position by springs 316. On the lower face of each arm is a cam 317 that bears on a spring elevated strip 318, normally tending to maintain the arms in the full line position shown in Fig. 31, and depending from each arm is a catch 319 adapted to engage with the beveled edge of a bar 320 that is carried by a pair of pins 321, slidable in openings formed in a bracket 322 carried by the frame, and said bar 320 is normally projected by springs 323.

When one of the cents keys is depressed, the arm beneath it will be engaged and forced from the full line position (Fig. 31) to the dotted line position, and the catch 319 will pass under the edge of the bar 320 and will be locked down in the dotted line position, directly in the path of movement of the delivery bar 218. The key depressed depends on the amount of the purchase, that is, if a purchase is three cents or eight cents, the 3 key is depressed, and this will result in the operation of the shank 301, and the delivery of two cents as change, or if the purchase is four cents, or any amount in which four is added to a multiple of five, the 4 key is depressed, and this results in the operation of the lowermost cent slide and the delivery of a single cent.

As the delivery bar moves forward it engages in the notched end of the arm and forces the same forward to effect the delivery of the coin or coins. In so doing the catch 319 will be carried out of contact with the locking strip 320, and as the bar retracts, the cam 317, riding over the spring elevated strip 318, will carry the catch inward, so that its inclined edge will be slightly above the lower edge of the locking strip, and when the parts reassume normal position, the catch will be free from the locking device, and all of the keys will be in the normal position in readiness for another operation.

Where the amount deposited is five cents or less, for a purchase of five cents or less, it is not necessary to operate the deposit keys, the cents keys of the purchase side only being depressed, but where any amount over five cents, and involving fractions of five is concerned, it is necessary to manipulate the fractional currency deposit and purchase keys.

When any of the fractional currency keys of the bank 44 are depressed, and the fractional currency keys of the purchase side, of bank 46, are depressed, one of the selecting slides of the fractional currency side is operated, and it will move to adjust one or other of its selecting openings, or a set of its selecting openings, in alinement with the selecting pins carried by the bar 239, and this will result, in the absence of mechanism to prevent it, in the delivery of change in excess of the exact amount, in much the same manner as excessive change from the dollar side would be delivered in the example previously quoted. To illustrate, if the customer deposits one dollar, and the amount of purchase is forty-eight cents, the clerk depresses the dollar key of the deposit side and the 45 cent key of the bank 46 of the purchase side, and then the cents key 3 of the bank 47. If the latter bank of keys had no connection with the mechanism operated by the bank 46, the selecting slide on the fractional currency side would be moved up to a point controlled by the dollar key on the deposit bank, and thence forward until stopped by the 45 cent key, the slide being so adjusted at that time as to permit the delivery of the difference between forty five cents and one dollar, or fifty-five cents, and the depression of the 3 cent key would effect also the delivery of two cents, so that the customer would receive fifty-seven cents in all, or an excess of five cents. To prevent this, provision is made for stopping the advance movement of the fractional currency slide at a point one step in advance of the selecting movement, and this is accomplished in practically the same way as the dollar selecting slide is stopped to split up a dollar into change. To accomplish this, the key levers 157 of the fractional currency side are of practically the same shape as the key levers 174, that is to say, each lever is provided on one side with a recess 325, and on the opposite side with a pin 326, and from the inner end of each lever projects a tongue 327. A normal depression of one of the levers 157 from the full line position shown in Fig. 3 to the dotted line position c in the same figure, will elevate one of the pins 155, to a position to stop the advance of the selecting slide 60, and during this movement the pin 326 of the depressed lever will enter the slot 325 of the next lever of higher value but will not operate the same. If further movement, however, is imparted to the first lever, this second lever will also be operated, in order to force its pin up to slide stopping position.

The frame is provided with suitable guides 328 (Fig. 3) for the reception of a transversely disposed slide 329 arranged in a position under the forwardly projecting tongues 327 of levers 157. This slide is connected by a rod 330 to the spring elevated plate or strip 318, the rod being fulcrumed on a hanger 331 carried by a fixed member of the frame. As the strip 318 is placed under all of the cents keys, the depression of any one of these keys will elevate the inner end of the rod 330, and the slide 329 will be raised and will engage any one of the levers 157 which may have been moved to the dotted line position c of Fig. 3, and will transmit through said lever and its pin 326 a movement to a second lever, being the lever of next highest value in the bank 46, and in this case the lever will be moved to the position e of Fig. 3, such movement being permitted by the elongated eye 162 of the shanks of the key members. As each lever is arranged to represent a numerical value of five, the movement transmitted from one lever to the next lever will result in the stopping of the selecting slide at a point to cut off the delivery of five cents from the magazines, so that in the example quoted the 45 lever of the bank 46 will first be elevated in the usual manner, and then on the depression of the cents key 3 of the bank 47 will receive a further movement, and such movement will be transmitted to the next key lever of the bank 46, which is the lever representing a fifty cents value, and the stop pin 155 of said lever limits the forward movement of the selecting slide, so that fifty cents will be delivered from the magazine in place of fifty-five cents, and this, with the addition of the two cents delivered from the cents magazine will make the correct change, fifty-two cents.

To briefly describe a complete cycle of operations of the machine, a five dollar note is tendered in payment for a bill of goods amounting to three dollars and forty-eight cents.

The clerk depresses the deposit key 5 of the bank 43, and this moves the corresponding pin 111 (Fig. 11) into the path of movement of the box 57. He then depresses the 3 dollar key of the purchase bank 45, the fractional currency key 45 of the purchase bank 46, and then the 3 cent key of the bank 47. The crank is then turned in the direction of the arrow, Fig. 4, clockwise to the extent of about three hundred and fifty degrees. During the first part of this movement, the lever 68 is allowed to descend, and weight 63, in moving down will elevate the two slide boxes 56 and 57. The slide boxes 57 will be stopped at a point determined by the position of the pin 111, while the box 56 will be elevated to its fullest extent, there having been no fractional currency key of the deposit bank depressed, and this will bring the lowermost slide 60 of the fractional currency slide, being the slide shown in Fig. 28, in alinement with the operating slide 128, while the opposite slide 128 will be in alinement with the dollar selecting slide, and it may here be observed that in all cases where even dollars are deposited, the selecting slide Fig. 28, being the slide capable of delivering ninety-five cents in change, will be moved to operative position in readiness to be operated if the purchase price is not in even dollars. If the purchase price is in even dollars, the slide shown in Fig. 28 will be forced full forward through the guide groove of the bar 151, and will not be stopped by any of the pins 155, and it will be moved to such an extent that when stopped, a blank space will be presented under the selecting pins 238, and as no selecting pins can then be depressed, none of the fractional currency slides will be operated and no change less than a dollar can be delivered from the machine.

In case the amount of deposit is a dollar or less and in such an event none of the dollar purchase being depressed, the box which carries the dollar selecting slides will move to the highest position and the blank slide of said box will be moved outward for the purpose of preventing downward movement of any of the pins 268 so that no money can be delivered from the dollar or five dollar magazines. In the present example, however, the fractional currency keys have been operated, and the stop pin 155 connected to the fractional currency key 45 has been elevated and forms a stop for the fractional currency slide 60, while the 3 dollar key of the purchase side forms a stop for the dollar selecting slide.

The depression of the three dollar key, however, has moved the forwardly projecting tongue 182 of its operated lever into the path of the slide 168, and as the latter receives movement from the depressed key of the bank 46, through bar 164, said lever will be moved from the dotted line position a to the dotted line position b, and pin 183 engaging against the end wall of the slot 184 of the next highest key lever, being the 4 dollar key lever, will project its pin 173 into the path of movement of the dollar selecting slide, and the slide will be stopped one point short of the point originally selected. In the same manner the depression of the cents key will cause the strip 318 to be depressed and the previously depressed key lever 157 of the fractional currency side will be elevated, and its pin 326 will act against the wall of the slot or notch 325 and will elevate the key lever of next highest value, being the key lever representing fifty cents, so that the fractional currency selecting slide will be stopped one point short of that originally selected.

The selecting movement having been accomplished, the pawls 134 ride out of the notches 133 of the operating rods or bars 127 and 128, and on further movement the lug 137 engages against the bar 145, and the latter is moved over the anti-friction roller 245 of bar 239, depressing the latter and carrying with it all of the selecting pins. If any openings of the selecting slides are in alinement with the pins, the latter will pass through such openings, and this will permit the delivery slide actuating bars to move into alinement with the main delivery bar 218. Continued forward movement of the bar 145 will force the delivery bar 218 forward, and movement will be transmitted from the bar 218 to all of the bars or rods of the delivery slides which have been allowed to descend, said slides effecting the discharge of the change from the machine. At the completion of this movement, the crank has arrived at the limit of its movement in one direction, and is then reversed. In moving backward the bar 145 is first allowed to move under stress of its spring 146, and delivery bar 218 moves from engagement with the bars of the coin delivery slides. As bar 145 continues its rearward movement, it leaves the anti-friction roller 245, and bar 239 in ascending, carries with it the selecting pins. The pawls 134 then drop into engagement with the notches 133 of the operating slide bars 127 and 128, and the selecting slides are withdrawn until lugs 130 of the bars 127 and 128 ride against the inclined walls of notches 131 (Fig. 6), and the spring catches 129 are raised from engagement with the selecting slides. At this point the arm 72 moves under the lever 68 and the weight is once more elevated, allowing the delivery slide boxes 56 and 57 to descend by gravity, while the pawls 134 again move out of engagement with the notches 133, as shown in Fig. 5, and the parts are locked in position by the entrance of the locking bolt 76 of handle 75 into the notch or recess 77, (Fig. 1).

In order to limit the forward movement of both the slides 60 and 60' where no pin has been moved up into the path of travel of the slides, a pin 155' is placed in the bar 151, as shown in Fig. 37 and a stationary pin 173' is placed in the bar 152 in the path of movement of the slide 60'. In the latter case the blank slide will be stopped by engaging with this pin 173', so that undue forward movement of the slide, and danger of disconnection from its operating slide 128 will be avoided. In similar manner the pin 155' will stop the slide 60 in order to prevent danger of disconnection of said slide from its operating slide 127.

It is obvious that the several money receptacles may be removed at night and stored in a safe, and it is further obvious that recording or registering mechanism of any well known type may be arranged to receive movement from any one or all of the sets of keys, so that a strict record of the amount received may be kept, or records may be kept of the deposits, the amounts of purchase, and the amount of change received.

Having thus described the invention, what is claimed is:—

1. In a change making machine, a plurality of selectors, a deposit key controlled means for determining the selector to be operated, and a purchase key controlled means for determining the extent of movement of the selector.

2. In a change making machine, the combination with a plurality of selectors, each representing different money values, of means for determining the selector to be operated, and a purchase key controlled means for determining the extent of movement of the selector.

3. In a change making machine, the combination with a plurality of selectors, of a selector operating means, a deposit key controlled means for determining the selector to be adjusted into alinement with the operating means, and means for controlling the movement of the selector.

4. In a change making machine, a plurality of selectors, a selector-operating means, a deposit key controlled means for determining the selector to be adjusted into alinement with the operating means, and a purchase key controlled means for determining the extent of movement of the selector.

5. In a change making machine, the combination with a plurality of selectors, each representing different money values, of means for determining the selector to be operated, means for operating such selector, and a purchase key controlled means for determining the extent of movement of the selector.

6. In a change making machine, selectors representing amounts deposited, and fractional parts thereof, key actuated means for moving the selectors and purchase key means for determining the extent of movement of the selectors.

7. In a change making machine, a plurality of selectors arranged to represent either singly or in combination the amount deposited and fractional parts thereof, key actuated means for moving the selectors and means for limiting the movement of such selectors in accordance with the amount of the purchase.

8. In a change making machine, a plurality of selectors, means for moving to operative position a selector representing the amount deposited, and means for moving the selector a distance determined by the amount of purchase.

9. In a change making machine, a plurality of selectors, a selector carrier, means for controlling the extent of movement of the carrier, means for moving the selector from the carrier, a key controlled means for determining the extent of movement of the selector, and change delivery mechanism under the control of said selector.

10. In a change making machine, a plurality of selectors, each provided with openings representing values, the selectors as a whole representing different values, respectively, a deposit key controlled means for determining the selector to be operated, means for operating said selector, a purchase key controlled means for determining the extent of movement of the selector, and means under the control of the selector for effecting the discharge of money from the machine.

11. In a change making machine, a selector having openings representing values in arithmetical progression, means for moving said selector, and key actuated means for adjusting the extent of movement of the selector.

12. In a change making machine, a key actuated selector having openings representing values in arithmetical progression, key actuated means for adjusting the extent of movement of the selector, and delivery slides having members movable into said openings to effect their adjustment to operative position.

13. In a change making machine, a selector having openings representing values in arithmetical progression, a key board, the members of which represent values bearing a fixed relation to the values represented by the openings in the selector and controlling the movement of said selectors to operative position, and a second key board representing amounts of purchase and determining the extent of movement of the selector.

14. In a change-making machine, a selector having openings representing values in arithmetical progression, a key board representing values bearing a fixed relation to the values represented by the openings of the selector and determining the selector to be moved to operative position, and a second key board representing amounts of purchase and controlling the extent of movement of the selector.

15. In a change making machine, a plurality of independently movable selectors, each arranged to control the delivery of change in different amounts from a fixed unit up to the highest value of the selector, said selectors representing, respectively, highest values of different amount, and means for limiting movement of the selectors in accordance with the amount of purchase.

16. In a change making machine, a plurality of selectors, each representing, respectively, different amounts of purchase in arithmetical progression, means for adjusting to operative position a selector representing the amount deposited, and a purchase key controlled means for limiting movement of the selector in accordance with the amount of the purchase.

17. In a change making machine, a plurality of selectors having openings representing values in arithmetical progression, the highest values differing in the several selectors, a key board, the members of which represent deposit values bearing a fixed relation to the highest values of the several selectors, and a purchase key controlled means for determining the extent of movement of the selectors.

18. In a change making machine, a slidable selector having openings representing values, and change delivery devices having members movable into such openings, to effect their adjustment to operative position.

19. In a change making machine, a selector having openings representing values in arithmetical progression, means for moving the selector, keys for determining the extent of such movement, and change discharging devices having members movable into said openings to effect their adjustment to operative position.

20. In a change making machine, the combination with a plurality of selectors representing different monetary values, respectively, one of said selectors being movable at each operation of the machine, means for determining the selector to be operated, means for operating said selector, a key board for controlling the extent of movement of the selector, and a delivery means controlled by the selector.

21. In a change making machine, a plurality of selectors, representing different monetary values, respectively, and each provided with openings representing values in arithmetical progression, a deposit key controlled means for determining the selector to be operated, means for operating said selector, purchase key controlled means for determining the extent of movement of the selector, and delivery means controllable by the openings of said selector.

22. In a change making machine, a plurality of selectors, a carrier therefor, and deposit and purchase key boards, one controlling the movement of the carrier, and the other the movement of the selectors.

23. In a change making machine, independently movable change delivery members normally held in inoperative position, pins connected thereto, a plurality of selectors having openings to permit the entrance of any one or all of the pins and adjustment of the delivery members to operative position, a key board mechanism for determining the selector to be operated, and a key board mechanism for controlling the extent of movement of said selector.

24. In a change making machine, delivery members including independently yieldable pins, and a key board controlled means for determining the extent of movement of the pins and the adjustment of the delivery members to operative or inoperative position.

25. In a change making machine, change delivery members including independently yieldable pins, and a perforated selector, the selector and pins having relative movement to determine the delivery members to be operated.

26. In a change making machine, a perforated selector, and change delivery members including independently yieldable pins, which, by engagement with said selector, are permitted to move varying distances to determine the delivery members to be operated.

27. In a change making machine, change delivery members including pins, a plurality of selectors, a bank of keys for determining the selector to be operated, means for moving said selector, and purchase key controlled means determining the extent of movement of the selector in accordance with the amount of a purchase, each selector having openings that are adjustable into alinement with the pins, and means for effecting relative movement of the pins and selector to determine the delivery members to be operated.

28. In a change making machine, a plurality of change delivery members, each including a movable pin, a plurality of selectors, each having perforations that may be adjusted into alinement with the pins, means for determining the selector to be operated, and means for determining the opening or openings of said selector to be moved into alinement with said pins.

29. In a change making machine, a plurality of selectors, each provided with openings representing values in arithmetical progression, a selector operating means, means for determining the selector to be operated, means controlling the extent of movement of the selector, change delivery members having pins movable through said openings, and an operating means for engaging selected delivery members.

30. In a change making machine, a selector, independent means for moving the selector in two planes at an angle to each other, and a change delivery mechanism under the control of the selector.

31. In a change making machine, a plurality of selectors, means for moving the whole of said selectors bodily in one plane to any predetermined position, means for moving any one of the selectors in a plane at an angle to the direction of the first movement, and means under the control of the selector for determining the amount of change to be delivered.

32. In a change making machine, a separate selector for each amount deposited, a selector operating means, and a bank of purchase keys for determining the extent of movement of said selectors.

33. In a change making machine, a separate selector for each amount deposited, a selector operating means, a deposit key board for determining the selector moved to operative position, and a purchase key board for determining the extent of movement of said selector.

34. In a change making machine, a plurality of selectors, a deposit key board for determining the movement of said selectors to operative position, each selector controlling the discharge of an amount less than the amount represented by the deposit which determines its movement.

35. In a change making machine, a plurality of selectors, each controlling the delivery of change up to a predetermined amount, a deposit key board for determining the selector to be operated, the selector controlled by each key controlling the delivery of a maximum amount less than the amount represented by said key.

36. In a change making machine, a plurality of selectors, a deposit key board controlling the movement of said selector to operative position, the selector under the control of each key having a maximum delivery capacity that is less than the amount represented by said key.

37. In a change making machine, a deposit key board, and a plurality of selectors, each deposit key having a separate selector under its control, the maximum change delivery capacity of said selector being less than the amount represented by the key, each selector having openings representing a fixed maximum and fractions thereof.

38. In a change making machine, a plurality of selectors, a carrier therefor, a deposit key board for controlling the extent of movement of the carrier, a selector operating means, and a purchase key board for controlling the extent of movement of the selector.

39. In a change making machine, a plurality of selectors, a movable carrier for said selectors, a selector operating means, a deposit key board for controlling the extent of movement of the carrier, and a purchase key board for controlling the extent of movement of the selector.

40. In a change making machine, a plurality of selectors, a carrier for said selectors, a single selector operating means, a deposit key board controlling the extent of movement of the carrier to present any selector in alinement with the operating means, and a purchase key board for determining the extent of movement of said selector.

41. In a change making machine, a plurality of selectors, a carrier therefor, a plurality of stops for limiting the extent of movement of the carrier, a key board for adjusting the stops, a single operating means with which the selectors may be moved into alinement by the carrier, a plurality of stops for limiting the extent of movement of the selectors, and a purchase key board for adjusting said stops.

42. In a change making machine, a plurality of selectors, a carrier therefor, stops movable into the path of the carrier, a key board for adjusting said stops, a selector operating means, and purchase key controlled stops movable into the path of the selectors.

43. In a change making machine, a selector operating means, a plurality of selectors, a carrier for said selectors, means for moving the carrier, key board controlled stops adjustable into the path of movement of the carrier for determining the selector to be operated, and purchase key controlled stops for determining the extent of movement of the carrier.

44. In a change making machine, a carrier, a plurality of selectors supported thereby, means for moving the carrier, means for limiting such movement in accordance with the selector to be operated, and key controlled stops adjustable into the path of movement of the selector for determining the amount of change to be delivered.

45. In a change making machine, a carrier, means for moving the same, a plurality of stops adjustable into the path of movement of the carrier, finger keys for controlling the movement of the stops, a plurality of selecting slides supported by the carrier, a selector operating means, a selector guide along which a selector is moved by the operating means, and a plurality of key controlled stops movable across the guide for limiting the extent of movement of the selector.

46. In a change making machine, the combination with a carrier, of a plurality of selectors supported thereby, means for moving the carrier, a selector operating means arranged to engage any selector moved into alinement therewith, means for imparting uniform movement to the operating means, and means for limiting the movement of the selector in accordance with the amount of change to be delivered.

47. In a change making machine, a selector for determining the amount of change to be delivered, a selector operating means having uniform stroke, and a key controlled means for limiting movement of the selector.

48. In a change making machine, a selector having a variable stroke for determining the amount of change to be delivered, and a selector operating means having a uniform stroke.

49. In a change making machine, a selector having a variable stroke for determining the amount of change to be delivered, a key controlled means for adjusting such stroke, and a selector operating means having a uniform stroke, and detachably connected to the selector.

50. In a change making machine, a selector for determining the amount of change to be delivered, a key board controlled means for adjusting the extent of movement of the selector, and a selector operating device having a give-way connection to permit continued movement of the operating device after the stopping of the selector.

51. In a change making machine, a selector for determining the amount of change to be delivered, a key board controlled means for adjusting the extent of movement of the selector, a selector operating device having a uniform stroke, and a give-way connection between the operating means and the selector for permitting continued movement of the operating means after the stopping of the selector.

52. In a change making machine, a plurality of delivery members, pins connected to said members, a delivery bar for engaging and moving said members, and independently actuable selectors having openings or recesses adjustable into alinement with the pins to permit movement of one or more of said delivery members into the path of movement of the delivery bar.

53. In a change making machine, a plurality of delivery members normally occupying an inoperative position, pins carrying said members, a support for the pins, a selector having perforations for the passage of the pins, means for adjusting the position of the selector, means for moving the pins through the perforations to permit the adjustment of certain of the delivery members to operative position, and means for engaging those members which have been moved to operative position.

54. The combination with a plurality of slidable delivery members, of pins connected to said delivery members, a support on which the pins are yieldably mounted, a plurality of selectors having perforations for the passage of the pins, means for moving said selectors to present one or more of the perforations into a position in alinement with the pins, means for moving the support in the direction of the selector, and permitting the pins of selected delivery members to enter the perforations, and means for engaging and operating said selected members.

55. In a change making machine, the combination with a plurality of slidable delivery members, of pins connected to said members, a support on which the pins are yieldably mounted, selectors movable across the path of the pins, means for stopping the selectors in any predetermined position with respect to the pins, means for moving the support in the direction of the selectors, the pins of selected delivery members passing through openings in the selector and permitting movement of said members, to operative position, and means for engaging and moving the delivery members which have been adjusted to operative position.

56. The combination with a plurality of slidable delivery members normally held in inoperative position, of pins connected to said members, a support on which said pins are yieldably mounted, a plurality of selectors having openings representing different amounts to be discharged, means for moving said selectors, a key board controlled means for adjusting such movement, means for moving the support to permit the pins of selected members to pass through said openings, and move the members to operative position, and means for engaging and moving the delivery members which have been adjusted to operative position.

57. In a change making machine, the combination with a plurality of slidable delivery members normally held in inoperative position, pins connected to said delivery members, selectors having openings movable to positions below said pins, means for controlling the movement of the selectors, means for lowering the pins to permit those pins in alinement with openings to pass through said openings, and thus adjust the delivery members to operative position, and means for moving said delivery members.

58. In a change making machine, the combination with delivery slides, of bars connected thereto, spring supported pins carrying the rear ends of said bars, a vertically movable spring elevated support for the pins and their springs, an operating member for depressing the support and pins, a delivery bar actuated by said member and serving to engage the bars which have been adjusted into alinement therewith, selectors having openings for the passage of the pins, and means for determining the extent of movement of the selectors.

59. In a change making machine, a plurality of delivery slides, bars pivotally connected thereto and having notched or recessed rear ends, pins through which the free ends of the bars extend, springs tending to depress the pins, a vertically movable bar forming a support for the springs and pins, an operating member movable over said bar and serving to depress the same, a delivery bar for engaging the notched rear ends of the pivotally connected bars which have been adjusted to the lowest positions, a selector having pin receiving openings arranged in groups representing different monetary values, and means for controlling the extent of movement of the selector in accordance with the amount of change to be delivered.

60. In a change making machine, a pair of sets of selectors, one for controlling the delivery of monetary units, and the other for the delivery of fractional currency, key board controlled stops for limiting movement of the selectors, and means operable on movement of the fractional currency selector stop for readjusting the position of the unit selector stops.

61. In a change making machine, a pair of sets of selectors controlling, respectively, the discharge of monetary units and fractional currency, adjustable stops movable into the path of the selectors, key boards from which said stops are actuated, and means under the control of the fractional currency key board for readjusting the position of the unit selector stops.

62. In a change making machine, a pair of sets of selectors, one controlling the discharge of dollars and the other fractional currency, key board controlled stops for limiting the movement of the selectors, and means operable from the fractional currency key board for readjusting the positions of the stops of the dollar selector.

63. In a change making machine, the combination with a pair of sets of selectors controlling, respectively, the discharge of dollars and fractional currency, a pair of key boards, levers operated from the key boards, stops carried by the levers and movable into the path of the selectors, and means operable by the fractional currency key board for effecting movement of the dollar selector stop in advance of the dollar selector stop previously actuated from the dollar key board.

64. In a change making machine, a pair of sets of selectors controlling, respectively, the discharge of dollars and fractional currency, stops for limiting the movement of the selector, key boards controlling the movements of the stops, levers extending between the key boards and stops, each lever having a recess in one face and provided at its opposite face with a projecting pin or lug entering the recess of an adjacent lever, and a slide movable from the fractional currency key board for engaging a previously adjusted lever of the dollar key board and moving the same to transmit movement to an adjacent lever of the dollar selector stop.

65. In a change making machine, a pair of sets of selectors, controlling, respectively, the discharge of dollars and fractional currency, key controlled levers, stops actuated by said levers and movable into the path of the selectors, and means operable from the levers of the fractional currency stop for readjusting the position of a previously adjusted dollar selector stop.

66. In a change making machine, a plurality of sets of selectors for controlling the discharge of dollars and fractions thereof, deposit keys for controlling the movement of the selectors, stops movable into the path of the selectors, purchase keys for moving said stops and automatic means for locking said stops in adjusted position.

67. In a change making machine, the combination with a pair of sets of selectors for controlling the discharge of dollars and fractional currency, key board actuated levers, stops operable by the levers and movable into the path of the selectors, locking members arranged to engage with the levers and hold the same in adjusted position, and means for releasing said locking members after the discharge of the change from the machine.

68. In a change making machine, magazines arranged to contain different classes of money, a key board mechanism for controlling the discharge of money of all classes, and a means under the control of the operator for determining the class of money to be discharged.

69. In a change making machine, a plurality of magazines arranged, one to contain silver dollars, and the other paper dollars, key controlled discharging mechanisms, and means under the control of the operator for adjusting either discharging mechanism to operative position.

70. In a change making machine, a magazine having vertically slotted walls, money carrying trays arranged within the magazine and having projections entering said slots, auxiliary discharging slots formed in the walls of the magazine, the sets of slots being connected by transversely arranged recesses to permit the passage of the lugs of the trays from the vertical slots to the discharging slots.

71. In a change making machine, a plurality of magazines arranged for the reception of money discharging slides, bars extending therefrom, a delivery bar, and means for controlling the positions of the slide bars with relation to the delivery bar.

72. In a change making machine, the combination with the selector carrying boxes, of a key board, the keys of which are provided with notched shanks, a casing having guiding openings for the shanks, a locking strip having a pivoted edge arranged to engage with the notches and hold the shanks in adjusted position, and means for automatically moving said locking strip to release position.

73. In a change making machine, the combination with a pair of selector carrying boxes, of a weight for elevating the boxes, flexible connections extending between the boxes and the weight, guiding sheaves for said flexible connections, a lever for holding the weight in elevated position, and means for turning said lever to permit lowering of the weight and the raising of the boxes.

74. In a change making machine, the combination with a plurality of selector slides, of a carrier for raising and lowering said slides, a key board controlled means for adjusting the point of stop of the carrier, a slide, means for automatically connecting and disconnecting the same from the selecting slides, and an operating member having a give-way connection with said slide.

In testimony that I claim the foregoing as my own, I have hereto affixed my signature in the presence of two witnesses:

CHARLES ULMER.

Witnesses:
SIDNEY D. ADAMS,
GRACE L. MEADE.